(12) United States Patent
Rivera

(10) Patent No.: US 8,533,846 B2
(45) Date of Patent: Sep. 10, 2013

(54) METHOD AND SYSTEM FOR DYNAMICALLY ASSOCIATING ACCESS RIGHTS WITH A RESOURCE

(75) Inventor: Juan Rivera, Fort Lauderdale, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 1051 days.

(21) Appl. No.: 11/557,683

(22) Filed: Nov. 8, 2006

(65) Prior Publication Data

US 2008/0109912 A1 May 8, 2008

(51) Int. Cl.
*H04L 29/06* (2006.01)

(52) U.S. Cl.
USPC .................................. 726/26; 726/27; 726/29

(58) Field of Classification Search
USPC ....................... 726/2, 21, 26, 27, 28, 29, 30, 1
See application file for complete search history.

(56) References Cited

U.S. PATENT DOCUMENTS

| | | | |
|---|---|---|---|
| 4,779,189 A | 10/1988 | Legvold et al. |
| 5,057,996 A | 10/1991 | Cutler et al. |
| 5,129,084 A | 7/1992 | Kelly et al. |
| 5,175,852 A | 12/1992 | Johnson et al. |
| 5,187,790 A | 2/1993 | East et al. |
| 5,202,971 A | 4/1993 | Henson et al. |
| 5,249,290 A | 9/1993 | Heizer |
| 5,297,283 A | 3/1994 | Kelly et al. |
| 5,321,841 A | 6/1994 | East et al. |
| 5,341,478 A | 8/1994 | Travis et al. |
| 5,418,964 A | 5/1995 | Conner et al. |
| 5,437,025 A | 7/1995 | Bale et al. |
| 5,461,608 A | 10/1995 | Yoshiyama |
| 5,473,599 A | 12/1995 | Li et al. |
| 5,499,343 A | 3/1996 | Pettus |
| 5,504,677 A | 4/1996 | Pollin |
| 5,504,814 A | 4/1996 | Miyahara |
| 5,511,208 A | 4/1996 | Boyles et al. |

(Continued)

FOREIGN PATENT DOCUMENTS

| | | |
|---|---|---|
| AU | 3403602 | 5/2002 |
| CA | 2307008 | 10/2000 |

(Continued)

OTHER PUBLICATIONS

Administrator's Guide, Citrix NFuse Classic. Version 1.7, Citrix Systems Inc.

(Continued)

*Primary Examiner* — Kambiz Zand
*Assistant Examiner* — Hilary Branske
(74) *Attorney, Agent, or Firm* — Foley & Lardner LLP

(57) ABSTRACT

A method for dynamically associating, by a server, access rights with a resource includes the step of receiving, by the server, a request for a resource from a client. The server requests, from a policy engine, an identification of a plurality of access rights to associate with the resource, the plurality of access rights identified responsive to an application of a policy to the client. The server associates the resource with the plurality of access rights via a rights markup language. The server transmits the resource to the client with the identification of the associated plurality of access rights. An application program on the client makes an access control decision responsive to the associated plurality of access rights. The application program provides restricted access to the resource responsive to the access control decision.

35 Claims, 9 Drawing Sheets

(56) References Cited

U.S. PATENT DOCUMENTS

| | | |
|---|---|---|
| 5,515,508 A | 5/1996 | Pettus et al. |
| 5,553,242 A | 9/1996 | Russell et al. |
| 5,557,346 A | 9/1996 | Lipner et al. |
| 5,557,748 A | 9/1996 | Norris |
| 5,557,765 A | 9/1996 | Lipner et al. |
| 5,561,769 A | 10/1996 | Kumar et al. |
| 5,586,312 A | 12/1996 | Johnson et al. |
| 5,590,199 A | 12/1996 | Krajewski et al. |
| 5,596,745 A | 1/1997 | Lai et al. |
| 5,606,668 A | 2/1997 | Shwed |
| 5,633,929 A | 5/1997 | Kaliski, Jr. |
| 5,640,454 A | 6/1997 | Lipner et al. |
| 5,657,390 A | 8/1997 | Elgamal et al. |
| 5,701,484 A | 12/1997 | Artsy |
| 5,706,437 A | 1/1998 | Kirchner et al. |
| 5,727,249 A | 3/1998 | Pollin |
| 5,729,734 A | 3/1998 | Parker et al. |
| 5,734,865 A | 3/1998 | Yu |
| 5,737,622 A | 4/1998 | Rogers et al. |
| 5,745,573 A | 4/1998 | Lipner et al. |
| 5,757,795 A | 5/1998 | Schnell |
| 5,761,662 A | 6/1998 | Dasan |
| 5,764,915 A | 6/1998 | Heimsoth et al. |
| 5,794,207 A | 8/1998 | Walker et al. |
| 5,802,306 A | 9/1998 | Hunt |
| 5,828,840 A | 10/1998 | Cowan et al. |
| 5,835,726 A | 11/1998 | Shwed et al. |
| 5,838,910 A | 11/1998 | Domenikos et al. |
| 5,838,916 A | 11/1998 | Domenikos et al. |
| 5,844,553 A | 12/1998 | Hao et al. |
| 5,848,410 A | 12/1998 | Walls et al. |
| 5,860,068 A | 1/1999 | Cook |
| 5,867,494 A | 2/1999 | Krishnaswamy et al. |
| 5,884,046 A | 3/1999 | Antonov |
| 5,928,363 A | 7/1999 | Ruvolo |
| 5,938,733 A | 8/1999 | Heimsoth et al. |
| 5,951,694 A | 9/1999 | Choquier et al. |
| 5,956,403 A | 9/1999 | Lipner et al. |
| 5,960,170 A | 9/1999 | Chen et al. |
| 5,968,176 A | 10/1999 | Nessett et al. |
| 5,983,190 A | 11/1999 | Trower et al. |
| 5,983,268 A | 11/1999 | Freivald et al. |
| 5,987,611 A | 11/1999 | Freund |
| 5,991,406 A | 11/1999 | Lipner et al. |
| 5,999,179 A | 12/1999 | Kekic et al. |
| 5,999,525 A | 12/1999 | Krishnaswamy et al. |
| 6,003,030 A | 12/1999 | Kenner et al. |
| 6,026,440 A | 2/2000 | Shrader et al. |
| 6,032,260 A | 2/2000 | Sasmazel et al. |
| 6,058,431 A | 5/2000 | Srisuresh et al. |
| 6,085,247 A | 7/2000 | Parsons et al. |
| 6,088,728 A | 7/2000 | Bellemore et al. |
| 6,108,712 A | 8/2000 | Hayes, Jr. |
| 6,151,599 A | 11/2000 | Shrader et al. |
| 6,157,953 A | 12/2000 | Chang et al. |
| 6,158,007 A | 12/2000 | Moreh et al. |
| 6,161,126 A | 12/2000 | Wies et al. |
| 6,199,753 B1 | 3/2001 | Tracy et al. |
| 6,223,288 B1 | 4/2001 | Byrne |
| 6,272,556 B1 | 8/2001 | Gish |
| 6,272,632 B1 | 8/2001 | Carman et al. |
| 6,275,942 B1 | 8/2001 | Bernhard et al. |
| 6,321,337 B1 | 11/2001 | Reshef et al. |
| 6,335,927 B1 | 1/2002 | Elliott et al. |
| 6,339,595 B1 | 1/2002 | Rekhter et al. |
| 6,345,239 B1 | 2/2002 | Bowman-Amuah |
| 6,377,952 B1 | 4/2002 | Inohara et al. |
| 6,383,478 B1 | 5/2002 | Prokop et al. |
| 6,405,219 B2 | 6/2002 | Saether et al. |
| 6,405,252 B1 | 6/2002 | Gupta et al. |
| 6,412,007 B1 | 6/2002 | Bui et al. |
| 6,415,329 B1 | 7/2002 | Gelman et al. |
| 6,421,726 B1 | 7/2002 | Kenner et al. |
| 6,427,132 B1 | 7/2002 | Bowman-Amuah |
| 6,442,571 B1 | 8/2002 | Haff et al. |
| 6,452,915 B1 | 9/2002 | Jorgensen |
| 6,463,470 B1 | 10/2002 | Mohaban et al. |
| 6,463,474 B1 | 10/2002 | Fuh et al. |
| 6,466,984 B1 | 10/2002 | Naveh et al. |
| 6,470,453 B1 | 10/2002 | Vilhuber |
| 6,496,935 B1 | 12/2002 | Fink et al. |
| 6,502,125 B1 | 12/2002 | Kenner et al. |
| 6,502,131 B1 | 12/2002 | Vaid et al. |
| 6,516,315 B1 | 2/2003 | Gupta |
| 6,519,581 B1 | 2/2003 | Hofmann et al. |
| 6,519,643 B1 | 2/2003 | Foulkes et al. |
| 6,526,056 B1 | 2/2003 | Rekhter et al. |
| 6,550,012 B1 | 4/2003 | Villa et al. |
| 6,553,377 B1 | 4/2003 | Eschelbeck et al. |
| 6,584,569 B2 | 6/2003 | Reshef et al. |
| 6,587,878 B1 | 7/2003 | Merriam |
| 6,591,367 B1 * | 7/2003 | Kobata et al. .................. 726/31 |
| 6,606,744 B1 | 8/2003 | Mikurak |
| 6,609,154 B1 | 8/2003 | Fuh et al. |
| 6,611,522 B1 | 8/2003 | Zheng et al. |
| 6,611,867 B1 | 8/2003 | Bowman-Amuah |
| 6,625,643 B1 | 9/2003 | Colby et al. |
| 6,625,645 B1 | 9/2003 | Van Horne et al. |
| 6,640,240 B1 | 10/2003 | Hoffman et al. |
| 6,640,248 B1 | 10/2003 | Jorgensen |
| 6,643,774 B1 | 11/2003 | McGarvey |
| 6,658,021 B1 | 12/2003 | Bromley et al. |
| 6,665,706 B2 | 12/2003 | Kenner et al. |
| 6,671,818 B1 | 12/2003 | Mikurak |
| 6,691,232 B1 | 2/2004 | Wood et al. |
| 6,697,849 B1 | 2/2004 | Carlson |
| 6,701,432 B1 | 3/2004 | Deng et al. |
| 6,718,380 B1 | 4/2004 | Mohaban et al. |
| 6,731,625 B1 | 5/2004 | Eastep et al. |
| 6,741,853 B1 | 5/2004 | Jiang et al. |
| 6,754,181 B1 | 6/2004 | Elliott et al. |
| 6,766,454 B1 | 7/2004 | Riggins |
| 6,766,457 B1 | 7/2004 | Baisley |
| 6,772,203 B1 | 8/2004 | Feiertag et al. |
| 6,772,347 B1 | 8/2004 | Xie et al. |
| 6,772,350 B1 | 8/2004 | Belani et al. |
| 6,799,221 B1 | 9/2004 | Kenner et al. |
| 6,850,943 B2 | 2/2005 | Teixeira et al. |
| 6,856,651 B2 | 2/2005 | Singh |
| 6,868,451 B1 | 3/2005 | Peacock |
| 6,871,346 B1 | 3/2005 | Kumbalimutt et al. |
| 6,873,988 B2 | 3/2005 | Herrmann et al. |
| 6,880,005 B1 | 4/2005 | Bell et al. |
| 6,901,072 B1 | 5/2005 | Wong |
| 6,901,075 B1 | 5/2005 | Baron |
| 6,909,708 B1 | 6/2005 | Krishnaswamy et al. |
| 6,914,886 B2 | 7/2005 | Peles et al. |
| 6,920,502 B2 | 7/2005 | Araujo et al. |
| 6,963,981 B1 | 11/2005 | Bailey et al. |
| 6,993,016 B1 | 1/2006 | Liva et al. |
| 7,036,051 B1 | 4/2006 | Fernandes |
| 7,069,434 B1 | 6/2006 | Ilnicki et al. |
| 7,092,370 B2 | 8/2006 | Jiang et al. |
| 7,100,054 B2 | 8/2006 | Wenisch et al. |
| 7,100,195 B1 | 8/2006 | Underwood |
| 7,102,996 B1 | 9/2006 | Amdahl et al. |
| 7,113,962 B1 | 9/2006 | Kee et al. |
| 7,114,180 B1 | 9/2006 | DeCaprio |
| 7,117,359 B2 | 10/2006 | Wood et al. |
| 7,117,504 B2 | 10/2006 | Smith et al. |
| 7,120,666 B2 | 10/2006 | McCanne et al. |
| 7,124,101 B1 | 10/2006 | Mikurak |
| 7,130,807 B1 | 10/2006 | Mikurak |
| 7,136,645 B2 | 11/2006 | Hanson et al. |
| 7,145,898 B1 | 12/2006 | Elliott |
| 7,165,222 B1 | 1/2007 | Suzuki |
| 7,178,166 B1 | 2/2007 | Taylor et al. |
| 7,246,230 B2 | 7/2007 | Stanko |
| 7,260,840 B2 | 8/2007 | Swander et al. |
| 7,269,664 B2 | 9/2007 | Hutsch et al. |
| 7,293,099 B1 | 11/2007 | Kalajan |
| 7,353,533 B2 | 4/2008 | Wright et al. |
| 7,363,347 B2 | 4/2008 | Thomas |
| 7,522,732 B2 | 4/2009 | Whitehead |

| | | | | | |
|---|---|---|---|---|---|
| 8,104,077 B1* | 1/2012 | Gauvin et al. ............... 726/12 | 2004/0111642 A1 | 6/2004 | Peles |
| 2001/0023421 A1 | 9/2001 | Numao et al. | 2004/0125756 A1 | 7/2004 | Lepore et al. |
| 2001/0037387 A1 | 11/2001 | Gilde et al. | 2004/0131042 A1 | 7/2004 | Lillie et al. |
| 2001/0047406 A1 | 11/2001 | Araujo et al. | 2004/0139178 A1 | 7/2004 | Mendez et al. |
| 2002/0032725 A1 | 3/2002 | Araujo et al. | 2004/0148292 A1 | 7/2004 | Clemens |
| 2002/0035451 A1 | 3/2002 | Rothermel | 2004/0148514 A1* | 7/2004 | Fee et al. ............... 713/200 |
| 2002/0049608 A1 | 4/2002 | Hartsell et al. | 2004/0153606 A1 | 8/2004 | Schott |
| 2002/0049841 A1 | 4/2002 | Johnson et al. | 2004/0158429 A1 | 8/2004 | Bary et al. |
| 2002/0059274 A1 | 5/2002 | Hartsell et al. | 2004/0162876 A1 | 8/2004 | Kohavi |
| 2002/0065864 A1 | 5/2002 | Hartsell et al. | 2004/0177247 A1 | 9/2004 | Peles |
| 2002/0095400 A1 | 7/2002 | Johnson et al. | 2004/0210320 A1 | 10/2004 | Pandya |
| 2002/0105972 A1 | 8/2002 | Richter et al. | 2004/0210771 A1 | 10/2004 | Wood et al. |
| 2002/0107903 A1 | 8/2002 | Richter et al. | 2004/0215826 A1 | 10/2004 | Pfitzner |
| 2002/0107962 A1 | 8/2002 | Richter et al. | 2004/0250124 A1 | 12/2004 | Chesla et al. |
| 2002/0107971 A1 | 8/2002 | Bailey et al. | 2004/0255154 A1 | 12/2004 | Kwan et al. |
| 2002/0107989 A1 | 8/2002 | Johnson et al. | 2004/0258003 A1 | 12/2004 | Kokot et al. |
| 2002/0107990 A1 | 8/2002 | Johnson et al. | 2004/0268361 A1 | 12/2004 | Schaefer |
| 2002/0108059 A1 | 8/2002 | Canion et al. | 2005/0004942 A1 | 1/2005 | Madsen et al. |
| 2002/0111972 A1 | 8/2002 | Lynch et al. | 2005/0015601 A1 | 1/2005 | Tabi |
| 2002/0116452 A1 | 8/2002 | Johnson et al. | 2005/0025125 A1 | 2/2005 | Kwan |
| 2002/0133593 A1 | 9/2002 | Johnson et al. | 2005/0044089 A1 | 2/2005 | Wu et al. |
| 2002/0133723 A1 | 9/2002 | Tait | 2005/0044108 A1 | 2/2005 | Shah et al. |
| 2002/0138618 A1 | 9/2002 | Szabo | 2005/0050053 A1 | 3/2005 | Thompson |
| 2002/0147927 A1 | 10/2002 | Tait | 2005/0050362 A1 | 3/2005 | Peles |
| 2002/0152373 A1 | 10/2002 | Sun et al. | 2005/0055570 A1 | 3/2005 | Kwan et al. |
| 2002/0165971 A1 | 11/2002 | Baron | 2005/0063083 A1 | 3/2005 | Dart et al. |
| 2002/0169887 A1 | 11/2002 | MeLampy et al. | 2005/0063519 A1 | 3/2005 | James |
| 2002/0174215 A1 | 11/2002 | Schaefer | 2005/0066163 A1 | 3/2005 | Ikenoya |
| 2002/0174227 A1 | 11/2002 | Hartsell et al. | 2005/0071652 A1 | 3/2005 | De Jong |
| 2002/0184224 A1 | 12/2002 | Haff et al. | 2005/0074126 A1 | 4/2005 | Stanko |
| 2003/0004950 A1 | 1/2003 | Wils et al. | 2005/0086206 A1 | 4/2005 | Balasubramanian et al. |
| 2003/0046586 A1 | 3/2003 | Bheemarasetti et al. | 2005/0097441 A1* | 5/2005 | Herbach et al. ............. 715/501.1 |
| 2003/0046587 A1 | 3/2003 | Bheemarasetti et al. | 2005/0120054 A1 | 6/2005 | Shulman et al. |
| 2003/0051130 A1 | 3/2003 | MeLampy et al. | 2005/0125663 A1 | 6/2005 | Funk |
| 2003/0055962 A1 | 3/2003 | Freund et al. | 2005/0132030 A1 | 6/2005 | Hopen et al. |
| 2003/0067874 A1 | 4/2003 | See et al. | 2005/0144481 A1* | 6/2005 | Hopen et al. ............... 713/201 |
| 2003/0084165 A1 | 5/2003 | Kjellberg et al. | 2005/0165928 A1 | 7/2005 | Shu et al. |
| 2003/0105604 A1 | 6/2003 | Ash et al. | 2005/0172335 A1* | 8/2005 | Aday et al. ............... 726/10 |
| 2003/0110192 A1 | 6/2003 | Valente et al. | 2005/0188215 A1 | 8/2005 | Shulman et al. |
| 2003/0120601 A1* | 6/2003 | Ouye et al. ............... 705/51 | 2005/0195835 A1 | 9/2005 | Savage et al. |
| 2003/0131079 A1 | 7/2003 | Neale et al. | 2005/0234852 A1 | 10/2005 | Coramutla |
| 2003/0131100 A1 | 7/2003 | Godon et al. | 2005/0246282 A1* | 11/2005 | Naslund et al. ............... 705/52 |
| 2003/0135626 A1 | 7/2003 | Ray et al. | 2005/0251573 A1* | 11/2005 | Merkow et al. ............... 709/226 |
| 2003/0145222 A1 | 7/2003 | Gittler et al. | 2005/0254652 A1 | 11/2005 | Engler et al. |
| 2003/0154239 A1 | 8/2003 | Davis et al. | 2005/0262063 A1 | 11/2005 | Conboy et al. |
| 2003/0163693 A1 | 8/2003 | Medvinsky | 2006/0004662 A1 | 1/2006 | Nadalin et al. |
| 2003/0172138 A1 | 9/2003 | McCormack et al. | 2006/0015570 A1 | 1/2006 | Khemani et al. |
| 2003/0177389 A1 | 9/2003 | Albert et al. | 2006/0020937 A1 | 1/2006 | Schaefer |
| 2003/0182423 A1 | 9/2003 | Shafir et al. | 2006/0029016 A1 | 2/2006 | Peles |
| 2003/0182431 A1 | 9/2003 | Sturniolo et al. | 2006/0036570 A1 | 2/2006 | Schaefer et al. |
| 2003/0188001 A1 | 10/2003 | Eisenberg et al. | 2006/0041635 A1 | 2/2006 | Alexander et al. |
| 2003/0188193 A1 | 10/2003 | Venkataramappa | 2006/0050703 A1 | 3/2006 | Foss |
| 2003/0191799 A1 | 10/2003 | Araujo et al. | 2006/0069912 A1 | 3/2006 | Zheng et al. |
| 2003/0191971 A1 | 10/2003 | Klensin et al. | 2006/0070131 A1 | 3/2006 | Braddy et al. |
| 2003/0195759 A1 | 10/2003 | Glassco et al. | 2006/0072755 A1 | 4/2006 | Oskari |
| 2003/0198189 A1 | 10/2003 | Roberts et al. | 2006/0075463 A1 | 4/2006 | Braddy et al. |
| 2003/0200234 A1 | 10/2003 | Koppich et al. | 2006/0190455 A1 | 8/2006 | Braddy et al. |
| 2003/0202480 A1 | 10/2003 | Swami | 2006/0200859 A1 | 9/2006 | England et al. |
| 2003/0212776 A1 | 11/2003 | Roberts et al. | 2006/0206931 A1 | 9/2006 | Dillaway et al. |
| 2003/0212817 A1 | 11/2003 | Matthews et al. | 2006/0230282 A1* | 10/2006 | Hausler ............... 713/182 |
| 2003/0217105 A1 | 11/2003 | Zircher et al. | 2007/0061871 A1 | 3/2007 | Simpkins et al. |
| 2003/0223361 A1 | 12/2003 | Hussain et al. | 2007/0100768 A1* | 5/2007 | Boccon-Gibod et al. ....... 705/59 |
| 2003/0229718 A1 | 12/2003 | Tock et al. | 2007/0101418 A1 | 5/2007 | Wood et al. |
| 2003/0233541 A1 | 12/2003 | Fowler et al. | 2008/0086564 A1 | 4/2008 | Putman et al. |
| 2003/0233581 A1 | 12/2003 | Reshef et al. | | | |
| 2003/0236837 A1 | 12/2003 | Johnson et al. | | FOREIGN PATENT DOCUMENTS | |
| 2003/0236861 A1 | 12/2003 | Johnson et al. | CA | 2421609 | 3/2002 |
| 2003/0236919 A1 | 12/2003 | Johnson et al. | EP | 0 442 839 A2 | 8/1991 |
| 2004/0006542 A1* | 1/2004 | Gilliam et al. ............... 705/51 | EP | 0 643 514 A2 | 3/1995 |
| 2004/0010601 A1 | 1/2004 | Afergan et al. | EP | 0 863 453 A1 | 9/1998 |
| 2004/0010621 A1 | 1/2004 | Afergan et al. | EP | 0 927 921 A2 | 7/1999 |
| 2004/0039594 A1* | 2/2004 | Narasimhan et al. ............. 705/1 | EP | 1 047 239 | 10/2000 |
| 2004/0039827 A1 | 2/2004 | Thomas et al. | EP | 1 049 306 | 11/2000 |
| 2004/0049515 A1 | 3/2004 | Haff et al. | EP | 1 289 225 | 3/2003 |
| 2004/0073512 A1 | 4/2004 | Maung | EP | 1 330 705 | 7/2003 |
| 2004/0078621 A1 | 4/2004 | Talaugon et al. | EP | 1 364 296 | 11/2003 |
| 2004/0078772 A1 | 4/2004 | Balay et al. | EP | 1 388 812 | 2/2004 |
| 2004/0095934 A1 | 5/2004 | Cheng et al. | FR | 2670100 | 2/1954 |
| 2004/0107360 A1 | 6/2004 | Herrmann et al. | JP | 06-332782 | 12/1994 |

| | | |
|---|---|---|
| JP | 10-191063 | 7/1998 |
| JP | 2000-307650 | 11/2000 |
| JP | 2002-513961 | 5/2002 |
| JP | 2002-259346 | 9/2002 |
| JP | 2002-328831 | 11/2002 |
| JP | 2002-366525 | 12/2002 |
| JP | 2004-021341 | 1/2004 |
| JP | 2004-509539 | 3/2004 |
| WO | WO-99/60462 A1 | 11/1999 |
| WO | WO-00/51290 A2 | 8/2000 |
| WO | WO-00/62507 A1 | 10/2000 |
| WO | WO-01/37517 | 5/2001 |
| WO | WO-01/75632 A1 | 10/2001 |
| WO | WO-02/23362 A1 | 3/2002 |
| WO | WO-02/37267 A2 | 5/2002 |
| WO | WO-02/39221 A2 | 5/2002 |
| WO | WO-02/39260 A2 | 5/2002 |
| WO | WO-02/39261 A2 | 5/2002 |
| WO | WO-02/39262 A2 | 5/2002 |
| WO | WO-02/39263 A2 | 5/2002 |
| WO | WO-02/39264 A2 | 5/2002 |
| WO | WO-02/39275 A2 | 5/2002 |
| WO | WO-02/39276 A2 | 5/2002 |
| WO | WO-02/39301 A2 | 5/2002 |
| WO | WO-02/39666 A2 | 5/2002 |
| WO | WO-02/39693 A2 | 5/2002 |
| WO | WO-02/39695 A2 | 5/2002 |
| WO | WO-02/41575 A2 | 5/2002 |
| WO | WO-02/42922 A2 | 5/2002 |
| WO | WO-02/43320 A2 | 5/2002 |
| WO | WO-02/43364 A2 | 5/2002 |
| WO | WO-02/46925 A2 | 6/2002 |
| WO | WO-02/46944 A2 | 6/2002 |
| WO | WO-02/46945 A2 | 6/2002 |
| WO | WO-02/058349 A1 | 7/2002 |
| WO | WO-02/069604 A2 | 9/2002 |
| WO | WO-02/093369 A1 | 11/2002 |
| WO | WO-02/103521 A1 | 12/2002 |
| WO | WO-2004/003879 | 1/2004 |
| WO | WO-2004/006041 | 1/2004 |
| WO | WO-2004/017601 A2 | 2/2004 |
| WO | WO-2004/049672 A2 | 6/2004 |
| WO | WO-2004/051964 A2 | 6/2004 |
| WO | WO-2004/066278 A2 | 8/2004 |
| WO | WO-2004/090672 A2 | 10/2004 |
| WO | WO-2005/024550 A2 | 3/2005 |
| WO | WO-2005/024567 A2 | 3/2005 |
| WO | WO-2005/024665 A1 | 3/2005 |
| WO | WO-2005/029313 A1 | 3/2005 |
| WO | WO-2005/029363 A1 | 3/2005 |
| WO | WO-2005/074232 A1 | 8/2005 |
| WO | WO-2005/084232 A2 | 9/2005 |
| WO | WO-2006/012533 A2 | 2/2006 |
| WO | WO-2006/017388 A1 | 2/2006 |

OTHER PUBLICATIONS

Advisory action for U.S. Appl. No. 10/711,731 dated Jan. 21, 2009.
Allison, Bridget et al., "File System Security: Secure Network Data Sharing for NT and UNIX," in Network Appliance, Inc. Tech Library pp. 16 pgs. Jan 1, 1998.
Anonymous, "Health Canada Takes Its Network Pulse," Communications News, 48, Oct. 2001, available at http://www.findarticles.com/p/articles/mi_m0DUD/is_5_23/ai_86039142.
Anonymous, "Multiple Platforms Bring Multiple Challenges," Communications News, 56, Oct. 2001, available at http://www.findarticles.com/p/articles/mi_m0CMN/is_10_38/ai_79370488.
Anonymous, "Remote Access," Secure Computing, 47-60, Oct. 1997.
Anonymous: "Citrix Metaframe 1.8—Backgrounder", Internet Publication, Apr. 24, 1999, XP002217973.
Antonoff, M., "Writing in a Spreadsheet," Personal Computing, 51-54, 1987.
Ao et al., "A Hierarchical Policy Specification Language, and Enforcement Mechanism, for Governing Digital Enterprises", 3rd IEEE International Workshop on Policies for Distributed Systems and Networks (Policy 2002), 38-49, IEEE CS Press, 2002, available at http://www.cs.rutgers.edu/~tdnguyen/pubs/ao-policy-2002.pdf.

Australian Office Action for AU application 2005292566 dated May 6, 2009.
Australian Office Action for AU application 2005292568 dated Apr. 27, 2010.
Back et al., "Contracts, Games and Refinement," TUCS Technical Report No. 138, Turku Centre for Computer Science, 1-15, Nov. 1997.
Beers, C., "McAfee Shores Up Your Defenses," Network Computing, 38, Jun. 2003, available at http://www.networkcomputing.com/1412/1412sp3.html.
Bird, T., "Reduce the Threat from Computers," Communications News, 36, 38-39, Mar. 2005, available at http://www.comnews.com/stories/articles/0305/0305reduce_threat.htm.
Brekne, T., "Mobile Agents and (In-)Security," Telektronikk, 34-46, 2000.
Carvalho et al., "Supporting Flexible Data Feeds in Dynamic Sensor Grids Through Mobile Agents," Lecture Notes in Computer Science vol. 2535, Proc. 6th International Conference on Mobile Agents (MA 2002), 171-185, Springer-Verlag, Germany, 2002.
Cheng et al., "Adjusting the Autonomy of Collections of Agents in Multiagent Systems," Lecture Notes in Computer Science vol. 3501, 33-37, Advances in Artificial Intelligence: Proc. 18th Conference of the Canadian Society for Computational Studies of Intelligence (Canadian AI 2005), Springer-Verlag, Germany, 2005.
Chinese Office Action for CN application 20050041052.2 dated Nov. 27, 2009.
Chinese Office Action for CN application 2005800470611 dated Jul. 17, 2009.
Citrix MetaFrame XP Security Standards and Deployment Scenarios. MetaFrame XP Server for Windows with Feature Release 3. Citrix Systems Inc.
Citrix Metaframe XPa for windows 2002.
Corradi et al., "Policy-Driven Management of Agent Systems," Lecture Notes in Computer Science vol. 1995, Policies for Distributed Systems and Networks: Proc. International Workshop (Policy 2001), 214-229, Springer-Verlag, Germany, 2001.
Dulay et al., "A Policy Deployment Model for the Ponder Language," Proc. IEEE/IFIP International Symposium on Integrated Network Management (IM 2001), 529-543, Seattle, Washington, USA, IEEE Press, 2001.
EP examination report for appl 07115385.9 dated May 23, 2008.
Esposito, A. et al., "Integrating Concurrency Control and Distributed Data into Workflow Frameworks: An Actor Model Perspective," 2000 IEEE International Conference on Systems, Man, and Cybernetics, vol. 3, 2110-2114, IEEE Press, 2000.
European Patent Office Examination Report dated Aug. 17, 2007 for Application No. 05798714. 3 pages.
European Search Report for European Application No. 08 00 9196, date of completion Oct. 23, 2008. (7 pages).
Exam Report for EP application 05798714.1 dated May 19, 2009.
Feldman, M., "Enterprise Wrappers for Information Assurance," Proc. DARPA Information Survivability Conference and Exposition (DISCEX '03), IEEE Press, 2003.
Fratto, M., "Hammering Out a Secure Framework," Network Computing, 79-80, 82, 84-87, 2000, available at http://www.networkcomputing.com/1101/1101f3.html.
Funk Software, "Funk Software's Endpoint Assurance Solution. The Secure Product Foundation for Endpoint Integrity," 2005, available at: http://www.juniper.net/welcome_funk.html.
Graniero, P.A. et al., "Investigating the Role of Fuzzy Sets in a Spatial Modeling Framework," Proc. 9th IFSA World Congress and 20th NAFIPS International Conference, 2370-2375, IEEE Press 2001.
Guy III, E.T., "An Introduction to the CAD Framework Initiative," Electro 1992 Conference Record, 78-83, Massachusetts, May 1992.
International Searching Authority, "International Search Report," PCT Application No. PCT/US05/028605, mailed on Jan. 18, 2005, 7 pgs.
International Searching Authority, "Partial International Annexed to Invitation to Pay fees," PCT Application No. PCT/ US05/028607, mailed on Dec. 14, 2005, 7 pgs.
International Searching Authority, "Written Opinion," PCT Application No. PCT/ US05/028605, mailed on Jan. 18, 2006, 7 pgs.

International Searching Authority, "Written Opinion," PCT Application No. PCT/ US05/028607, mailed on Mar. 31, 2006, 10 pgs.
International Searching Authority, International preliminary report on patentability to PCT/US05/028606, issued Apr. 3, 2007 (10 pages).
International Searching Authority, International Search Report related to PCT/US05/028606, mailed Feb. 24, 2006 (5 pages).
Jin, H. et al., "A Distributed Dynamic μFirewall Architecture With Mobile Agents and KeyNote Trust Management System," Lecture Notes in Computer Science, vol. 2513, Proc. 4th International Conference on Information and Communications Security, (ICICS 2002), 13-24, Springer-Verlag, Germany, 2002.
Jun, M. et al., "Application of Mobile Scanning Agent in the Network Security," J. of Systems Engineering and Electronics, 15(3): 371-376, 2004.
Juniper Networks NetScreen-SA 5000 Series. Spec Sheet Access Appliances, Juniper Networks, Sunnyvale, CA., 4 pages.
Juniper Networks, "Juniper Networks Infranet Controllers Provide Unified Access Control for all Users throughout Your Network," (Oct. 2005), available at: http://www.juniper.net/products/ua/dsheet/100137.pdf.
Keromytis, A.D. et al., "Transparent Network Security Policy Enforcement," Proc. USENIX Technical Conference, 215-225, San Diego, CA, USA, 2000.
Kim, S.C. et al., "Study of Security Management System Based on Client/ Server Model," 1403-1408, IEEE Press, 1999.
Klein, D., "Developing Applications with a UIMS," Proc. USENIX Applications Development Symposium, 37-56, 1994.
Kosar, T. et al., "A Framework for Reliable and Efficient Data Placement in Distributed Computing Systems," Journal of Parallel and Distributed Computing, vol. 65 (10), 1146-1157, Academic Press, Inc., Orlando, FL, USA, 2005.
Krief, F. et al., "An Intelligent Policy-Based Networking Environment for Dynamic Negotiation, Provisioning and Control of QoS," IFIP TC6/WG6.2 & WG6.7 Conference on Network Control and Engineering for QoS, Security and Mobility, (Net-Con 2002), 285-290, Kluwer Academic Publishers, 2002.
Law, K.L.E. et al., "Performance of a Multi-Tiered Policy-Based Management System," IFIP TC6/WG6.2 & WG6.7 Conference on Network Control and Engineering for QoS, Security and Mobility, (Net-Con 2002), 203-214, Kluwer Academic Publishers, 2002.
Law, K.L.E. et al., "Policy-Based Management With Active Networks," IFIP TC6/WG6.2 & WG6.7 Conference on Network Control and Engineering for QoS, Security and Mobility, (Net-Con 2002), 129-140, Kluwer Academic Publishers, 2002.
Law, K.L.E. et al., "UPM: Unified Policy-Based Network Management," Proc. SPIE, (ITCom 2001), vol. 4523, 326-337, Denver, CO, USA, 2001.
Lee, D.W. et al., "Managing Fault Tolerance Information in Multi-Agents Based Distributed Systems," Lecture Notes in Computer Science, vol. 2690, Intelligent Data Engineering and Automated Learning, (IDEAL 2003), 104-108, Springer-Verlag, Germany, 2003.
Maes, S. et al., "Identifiability of Causal Effects in a Multi-Agent Causal Model," IEEE/WIC International Conference on Intelligent Agent Technology, (IAT'03), 605, IEEE Press, 2003.
Mahler, R.P. et al. "Technologies for Unified Collection and Control of UCAVs," Proc. of SPIE vol. 4729, 90-101, 2002.
Matsuura, S. et al., "An Extension of ECA Architecture and its Application to HTML Document Browsing," IEEE International Conference on Systems, Man, and Cybernetics, vol. 1, 738-743, IEEE Press 1999.
Maxim, M. and Venugopal, A., "Securing Agent Based Architectures," Lecture Notes in Computer Science vol. 2480, Proc. First International Conference on Engineering and Deployment of Cooperative Information Systems, 220-231, Springer-Verlag, Germany, 2002.
McAfee System Protection Solutions, "Enforcing Endpoint Policies for Network Access Selecting the Right Solution for your Environment," 2005, available at: http://mcafee.com/us/local_content/white_papers/wp_mpe_securingyournetwork.pdf.

McAfee System Protection Solutions, "McAfee Policy Enforcer," 2005, available at: http://www.mcafee.com/us/local_content/datasheets/ds_policy_enforcer.pdf.
Meyer, B. et al., "Towards Implementing Policy-Based Systems Management," Distrib. Syst. Engng vol. 3, 78-85, The Institution of Electrical Engineers and IOP Publishing, Ltd., 1996, available at http://www.mobile.ifi.lmu.de/common/Literatur/MNMPub/Publikationen/map96/PDF-Version/map96.pdf.
Molta, D., "Odyssey Makes Wireless LANs a Safe Trip," Networking Computing, 24, 26, 2002, available at http://www.networkcomputing.com/1311/1311sp2.html.
Montanari, R. et al., "Context-Based Security Management for Multi-Agent Systems," Proc. Second IEEE Symposium on Multi-Agent Security and Survivability (MAS&S 2005), IEEE Press, 2005.
Neuman et al., The Kerberos Network Authentication Service (V5), Internet draft, work in progress, Sep. 2004.
Notice of Allowance for U.S. Appl. No. 10/711,729.
Notice of Allowance for U.S. Appl. No. 10/711,730.
Office Action for U.S. Appl. No. 10/711,729 dated Jun. 6, 2008.
Office action for U.S. Appl. No. 10/711,731 dated Apr. 17, 2009.
Office action for U.S. Appl. No. 10/711,731 dated Jun. 17, 2008.
Office action for U.S. Appl. No. 10/711,731 dated Oct. 20, 2008.
Office Action for U.S. Appl. No. 10/711,730 dated Apr. 28, 2009.
Office Action for U.S. Appl. No. 10/711,730 dated Jun. 27, 2008.
Office Action for U.S. Appl. No. 10/711,730 dated Dec. 11, 2008.
Office Action for U.S. Appl. No. 10/956,764 dated Oct. 8, 2008.
Office action for U.S. Appl. No. 11/272,598 dated Oct. 7, 2008.
Office Action for U.S. Appl. No. 11/365,355 dated Dec. 28, 2010
Office Action for U.S. Appl. No. 10/711,731 dated Jan. 6, 2010.
Office Action for U.S. Appl. No. 10/956,764 dated Mar. 4, 2010.
Office Action for U.S. Appl. No. 10/956,835 dated Feb. 18, 2010.
Office Action for U.S. Appl. No. 10/711,729 dated Sep. 4, 2009.
Office Action for U.S. Appl. No. 10/711,731 dated Sep. 21, 2009.
Office Action for U.S. Appl. No. 10/956,764 dated Jul. 7, 2009.
Office Action for U.S. Appl. No. 11/255,311 dated Jun. 23, 2009.
Office Action for U.S. Appl. No. 11/272,598 dated Jul. 23, 2009.
Page, S.E., "Self Organization and Coordination," Computational Economics, vol. 18, 25-48, Kluwer Academic Publishers, 2001.
Palmer, D. et al., "Decentralized Cooperative Auction for Multiple Agent Task Allocation Using Synchronized Random Number Generators," Proc. IEEE/RSJ International Conference on Intelligent Robots and Systems, 1963-1968, IEEE Press, 2003.
Patwardhan, A. et al., "Enforcing Policies in Pervasive Environments," First Annual International Conference on Mobile and Ubiquitous Systems: Networking and Services, (MobiQuitous '04), 299-308, IEEE Press, 2004.
Perkins et al., Route Optimization in Mobile IP, Internet draft, work in progress, Sep. 2001.
Randic, M. et al., "Object by Value Transfer Mechanisms for Obligation Policy Enforcement Object Loading," Proc. 12th IEEE Mediterranean Electrotechnical Conference, (Melecon 2004), IEEE Press, 2004.
Restriction requirement for U.S. Appl. No. 10/956,764 dated Apr. 1, 2009.
Simon et al., "A Cryptographic Protocol to Obtain Secure Communications in Extended Ethernet Environment," Proc. 17th Conf. on Local Computer Networks, 254-261, IEEE CS Press, 1992.
Sirbu, et al., "Distributed authentication in Kerberos using public key cryptograph," Proc. 1997 Symposium on Network and Distributed Systems Security (SNDSS'97), 134-141, IEEE CS Press, 1997.
Suri, N. et al., "DAML-Based Policy Enforcement for Semantic Data Transformation and Filtering in Multi-Agent Systems," Lecture Notes in Computer Science, vol. 2691, Proc. 2nd International Joint Conference on Autonomous Agents and Multi-Agent Systems, (AAMAS 2003), 1132-1133, ACM Press, New York, USA, 2003.
Suri, N. et al., "Enforcement of Communications Policies in Software Agent Systems through Mobile Code," Proc. 4th International Workshop on Policies for Distributed Systems and Networks, (Policy'03), 247, IEEE Press, 2003.
Takahaski, K. et al., "Integrating Heterogeneous and Distributed Information by Linking it to Structured Information as an 'Information Integration Directory'," J81-D-I(5): 443-450, 1998.

Tierling, E.: "Gezaehmtes Monster", CT Magazin Fuer Computer TEchnik, Verlag Heinz Heise GMBH., Hannover, DE, No. 10, 1998, pp. 226-228, 230, 23, XP000740851, ISSN: 0724-8679.

Uszok, A. et al., "KAoS Policy and Domain Services: Toward a Description-Logic Approach to Policy Representation, Deconfliction, and Enforcement," Proc. 4th International Workshop on Policies for Distributed Systems and Networks, (Policy'03), 93, IEEE Press, 2003.

Wang, D. et al., "Study oOn SOAP-Based Mobile Agent Techniques," Lecture Notes in Computer Science, vol. 2480, Proc. First International Conference on Engineering and Deployment of Cooperative Information Systems, 208-219, Springer-Verlag, Germany, 2002.

Wittner, O. and Helvik, B.E., "Distributed Soft Policy Enforcement by Swarm Intelligence; Application to Loadsharing and Protection," Ann. Telecommun., vol. 59, No. 1-2, 10-24, 2004.

Xia, H. et al., "Using Secure Coprocessors to Protect Access to Enterprise Networks," Lecture Notes in Computer Science, vol. 3462, Proc. International IFIP-TC6 Networking Conference, (Networking 2005), Springer-Verlag, Germany, 2005, available at http://www.cs.pitt.edu/~jcb/papers/net2005.pdf.

Xu, Y. et al., "An Agent-Based Data Collection Architecture for Distributed Simulations," Int'l J. of Modelling and Simulation, 24(2), 55-64, 2004.

Yang, K. et al., "Service and Network Management Middleware for Cooperative Information Systems through Policies and Mobile Agents," Lecture Notes in Computer Science, vol. 2480, Proc. First International Conference on Engineering and Deployment of Cooperative Information Systems, 232-246, Springer-Verlag, Germany, 2002.

Yang, S., "Setting up a Secure Public Workstation," "Iols '99: Proceedings of the 14th Integrated Online Library Systems Meeting May 19-20, 1999,", May 1998.

Yocom, B., et al., "A First Look at Wireless Security Products," Business Comm. Review, 36-48, Oct. 2003.

Yu, Y. et al., "Quality of Service Policy Control in Virtual Private Networks," Proc. of SPIE, vol. 5282, 1055-1060, 2003.

Zhang, Y. and You, J., "An RBAC Based Policy Enforcement Coordination Model in Internet Environment," Lecture Notes in Computer Science, vol. 2480, Proc. First International Conference on Engineering and Deployment of Cooperative Information Systems, 466-477, Springer-Verlag, Germany, 2002.

Examiner Comments for preparation of Oral Proceedings on Nov. 1, 2011 in EPO in Berlin for EP 05798714 dated Dec. 30, 2010.

International Searching Authority, International Search Report for PCT appn PCT/US05/028607.

Kohl and Neuman, The Kerberos Network Authentication Service (V5), Internet Draft, Sep. 1993.

Notice of Allowance for U.S. Appl. No. 10/956,764 dated Sep. 21, 2010.

Notice of Allowance for U.S. Appl. No. 10/956,832 dated Sep. 21, 2010.

Notice of Reasons for Rejection for JP 2007-534587 dated Dec. 10, 2010.

Office Action for AU appln 2005292566 dated Jun. 23, 2010.

Official Action for Israeli Patent Application No. 182286 dated Dec. 23, 2010 (including translation).

TCG Published, "TCG Trusted Network Connect TNC Architecture for Interoperability," 2005, available at: https://www.trustedcomputinggroup.org/groups/network/TNC_Architecture_v1_0_r4.pdf.

TCG Published, "TCG Trusted Network Connect TNC IF-IMC," 2005, available at: https://www.trustedcomputinggroup.org/groups/network/TNC_IFIMC_v1_0_r3.pdf.

Trusted Computing Group, "Trusted Network Connect Open Standards for Integrity-Based Network Access Control," 2005, available at: https://www.trustedcomputinggroup.org/groups/network/Open_Standard_for_IntegrityBased_AccessControl.pdf.

Trusted Computing Group, "Trusted Network Connect to Ensure Endpoint Integrity," 2005, available at: https://www.trustedcomputing group.org/groups/network/TNC_NI-collateral_10_may_(2).pdf.

TCG Published, "TCG Trusted Network Connect TNC IF-IMV," 2005, available at: https://www.trustedcomputinggroup.org/groups/network/TNC_IFIMV_v1_0_r3.pdf.

US Notice of Allowance for U.S. Appl. No. 11/255,311 Dtd May 20, 2011.

US Notice of Allowance for U.S. Appl. No. 11/365,355 Dtd Apr. 13, 2011.

US Office Action for U.S. Appl. No. 10/711,731 Dtd Feb. 1, 2011.

US Office Action for U.S. Appl. No. 11/255,311 Dtd Sep. 30, 2010.

* cited by examiner

METHOD AND SYSTEM FOR DYNAMICALLY ASSOCIATING ACCESS RIGHTS WITH A RESOURCE

FIELD OF THE INVENTION

The present invention relates to methods and systems for associating access rights with resources. In particular, the present invention relates to methods and systems for dynamically associating access rights with a resource.

BACKGROUND OF THE INVENTION

Rights management languages, such as the extensible rights markup language (XRML) standard or the Open Digital Rights Language (ODRL) standard, typically provide functionality for identifying attributes associated with digital resources. Attributes in conventional systems typically comprise a set of rights or conditions associated with a resource. Rights markup languages typically provide benefits including flexibility in defining attributes for varying business models, interoperability between trust environments using similar markup languages, and extendible language schema that are customizable by administrators.

However, conventional systems typically require processing of individual resources to associate the resources with the appropriate rights or conditions. Processing resources may include identifying a set of attributes to associate with a resource, digitally signing the resource with an identification of the identified attributes, and publishing the digitally signed resource, for example, by uploading the resource to a shared server. Typically, individual resources are processed one at a time and resources must be associated with attributes before the resources are made available to users. The processing of each resource in an organization may create a significant administrative task.

Additionally, once processed, the attributes are typically permanently associated with the resources. The same attributes are typically enforced regardless of differences between the clients requesting the access. However, different policies, and therefore different access right attributes, may apply to different clients, or to a single client at different times. For example, one client may satisfy a policy and be authorized for a particular level or type of access to a resource, while another client fails to satisfy the policy and is not authorized for any access to the same resource. In another example, a client making a request at one point in time may satisfy an applicable policy but may no longer satisfy the applicable policy at the time of a later request, for example when the client makes the request from a different network. Alternatively, an administrator may wish to change an attribute associated with a resource, or a policy identifying the attributes associated with a resource, without wishing to re-process all the resources in an organization.

A dynamic method for assigning attributes to a resource at the time of the request for access to a resource, instead of before, would be desirable. Additionally, a flexible method for assigning varying attributes based on real-time evaluations of clients, and information associated with the clients, at the time the clients make the request would be desirable.

SUMMARY OF THE INVENTION

In one aspect, a method for dynamically associating, by a server, access rights with a resource includes the step of receiving, by the server, a request for a resource from a client. The server requests, from a policy engine, an identification of a plurality of access rights to associate with the resource, the plurality of access rights identified responsive to an application of a policy to the client. The server associates the resource with the plurality of access rights via a rights markup language. The server transmits the resource to the client with the identification of the associated plurality of access rights. An application program on the client makes an access control decision responsive to the associated plurality of access rights. The application program provides restricted access to the resource responsive to the access control decision.

In one embodiment, information is gathered about the client. In another embodiment, a policy is applied to the gathered information. In still another embodiment, the policy engine applies a policy to the gathered information to make an access control decision.

In one embodiment, the server receives an identification of a plurality of access rights including a right to retrieve a file. In another embodiment, the server receives an identification of a plurality of access rights including a right to view a version of a file displayed using Hypertext Markup Language (HTML). In still another embodiment, the server receives an identification of a plurality of access rights including a right to receive output data generated by an execution of the resource on an application server.

In one embodiment, the server receives an identification of a plurality of access rights including a right to print a copy of the resource. In another embodiment, the server receives an identification of a plurality of access rights including a right to save a local copy of the resource. In still another embodiment, the server receives an identification of a plurality of access rights including a right to transmit, via electronic mail, a copy of the resource.

In one embodiment, the application program denies a request to retrieve the resource. In another embodiment, the application program allows a request to retrieve the resource. In still another embodiment, the application program denies a request to modify the resource.

In one embodiment, the application program denies a request to receive output data generated by an execution of the resource. In another embodiment, the application program displays a version of the resource displayed using the Hypertext Markup Language (HTML), responsive to a request to retrieve the resource. In still another embodiment, the application program allows a request to receive output data generated by an execution of the resource on an application server.

In one embodiment, the server transmits the resource and the associated plurality of access rights to an application program executing on a second server. In another embodiment, the application program executing on the second server makes an access control decision responsive to the identified at least one access right. In still another embodiment, the application program executing on the second server provides restricted access to the resource responsive to the access control decision.

In one embodiment, a system for dynamically associating access rights with a resource comprises a server, a policy engine, and an application program. The server receives a request for access to a resource from a client. The policy engine receives a request from the server for an identification of a plurality of access rights to associate with the resource, the plurality of access rights identified responsive to an application of a policy to the client. The application program receives, from the server, a copy of the resource associated with the identified plurality of access rights via a rights markup language, and an identification of the associated plurality of access rights.

In one embodiment, the policy engine includes a collection agent gathering information about the client. In another embodiment, the policy engine includes a policy database, the policy engine applying a policy from the policy database to the gathered information. In still another embodiment, the server includes a means for transmitting a collection agent to a client.

In one embodiment, the server includes a means for associating the resource with an access right using an extensible rights markup language (XRML). In another embodiment, the server includes a means for signing the resource using an extensible rights markup language (XRML). In still another embodiment, the server includes a means for associating a resource with a requirement to view a version of the file displayed using the Hypertext Markup Language (HTML).

In one embodiment, the server includes a means for associating the resource with a right to receive output data generated by an execution of the resource on an application server. In another embodiment, the server includes a means for associating the resource with a right to print a copy of the resource. In still another embodiment, the server includes a means for associating the resource with a right to save a local copy of the resource. In yet another embodiment, the server includes a means for associating the resource with a right to transmit via electronic mail a copy of the resource.

In one embodiment, the application program is configured to make an access control decision responsive to the identification of the associated plurality of access rights. In another embodiment, the application program includes a component for applying an access right in the associated plurality of access rights to the request for the resource. In still another embodiment, the application program further comprises a means for denying a request to retrieve the resource. In yet another embodiment, the application program includes a means for viewing a version of the resource displayed using the Hypertext Markup Language (HTML). In a further embodiment, the application program includes a connection to a client agent displaying on the client received output data generated by an execution of the resource on an application server.

In one embodiment, the server comprises a transmitter sending the resource and the identification of the associated plurality of access rights to an application program executing on a second server. In another embodiment, the application program executing on the second server includes a means for making an access control decision responsive to an access right in the associated plurality of access rights. In still another embodiment, the application program executing on the second server includes a means for providing restricted access to the resource responsive to the access control decision. In yet another embodiment, the application program executing on the second server includes an agent for transmitting output data generated by the application program to the client and providing restricted access to the output data responsive to the access control decision.

BRIEF DESCRIPTION OF THE DRAWINGS

The foregoing and other objects, aspects, features, and advantages of the invention will become more apparent and better understood by referring to the following description taken in conjunction with the accompanying drawings, in which.

DETAILED DESCRIPTION OF THE INVENTION

Figure 1A:
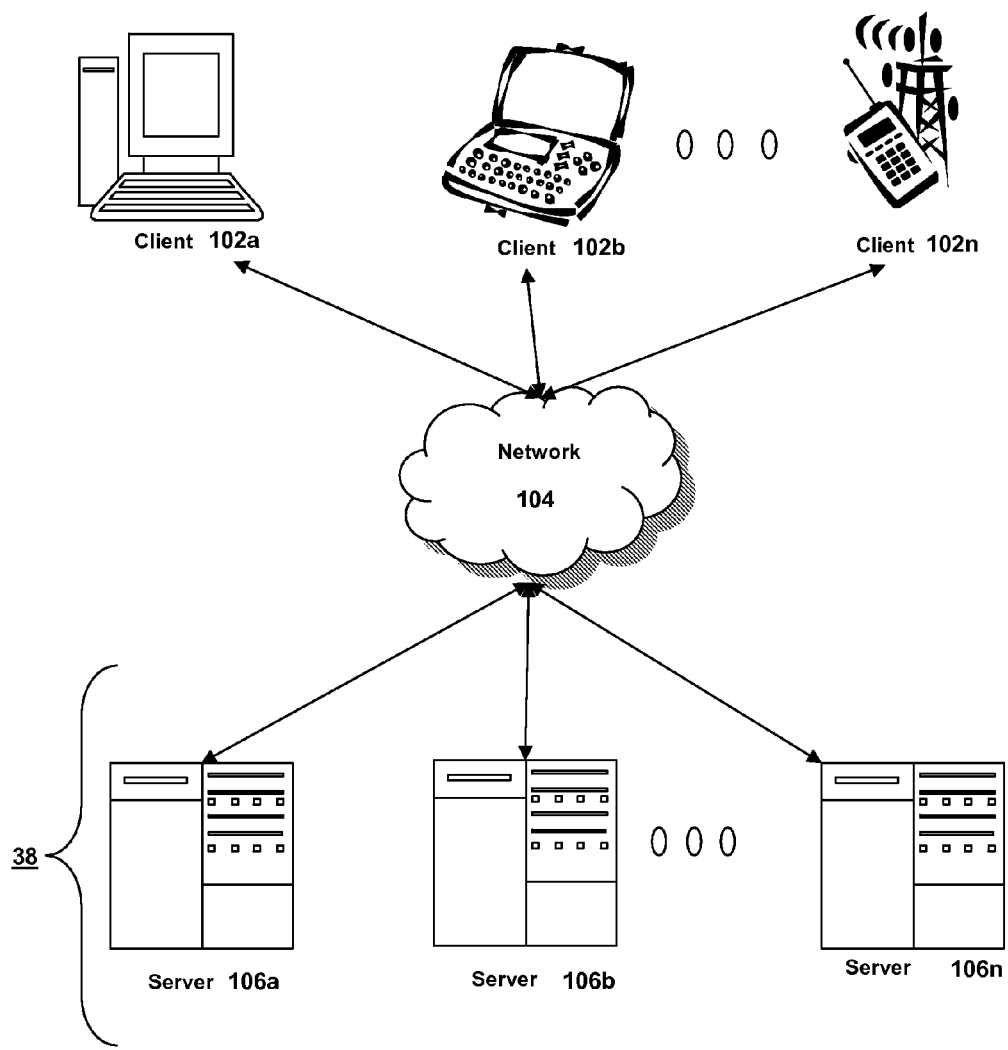
FIG. 1A is a block diagram depicting an embodiment of a network environment comprising client machines in communication with remote machines.

Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106) via one or more networks 104.

Although FIG. 1A shows a network 104 between the clients 102 and the servers 106, the clients 102 and the servers 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the clients 102 and the servers 106. In one of these embodiments, a network 104' may be a private network and a network 104 may be a public network. In another of these embodiments, a network 104 may be a private network and a network 104' a public network. In still another embodiment, networks 104 and 104' may both be private networks.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 and network topology may be of any such network or network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In one embodiment, the system may include multiple, logically-grouped servers 106. In these embodiments, the logical group of servers may be referred to as a server farm 38. In some of these embodiments, the servers 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or a metropolitan-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Server 106 may be a file server, application server, web server, proxy server, appliance, network appliance, gateway, application gateway, gateway server, virtualization server, deployment server, SSL VPN server, or firewall. In some embodiments, a server 106 may have the capacity to function as either an application server or as a master application server. In one embodiment, a server 106 may include an Active Directory. The remote machine 106 may be an application acceleration appliance. For embodiments in which the remote machine 106 is an application acceleration appliance, the remote machine 106 may provide functionality including firewall functionality, application firewall functionality, or load balancing functionality. In some embodiments, the remote machine 106 comprises an appliance such as one of the line of appliances manufactured by the Citrix Application Networking Group, of San Jose, Calif., or Silver Peak Systems, Inc., of Mountain View, Calif., or of Riverbed Technology, Inc., of San Francisco, Calif., or of F5 Networks, Inc., of Seattle, Wash., or of Juniper Networks, Inc., of Sunnyvale, Calif.

The clients 102 may also be referred to as client nodes, client machines, endpoint nodes, or endpoints. In some embodiments, a client 102 has the capacity to function as both a client node seeking access to resources provided by a server and as a server providing access to hosted resources for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106b hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives output data, such as display data, generated by an execution of the identified application on the server 106.

In some embodiments, the server 106 or a server farm 38 may be running one or more applications, such as an application providing a thin-client computing or remote display presentation application. In one embodiment, the server 106 or server farm 38 executes as an application, any portion of the Citrix Access Suite™ by Citrix Systems, Inc., such as the MetaFrame or Citrix Presentation Server™, and/or any of the MICROSOFT WINDOWS Terminal Services manufactured by the Microsoft Corporation. In another embodiment, the application is an ICA client, developed by Citrix Systems, Inc. of Fort Lauderdale, Fla. In still another embodiment, the server 106 may run an application, which for example, may be an application server providing email services such as MICROSOFT EXCHANGE manufactured by the Microsoft Corporation of Redmond, Wash., a web or Internet server, or a desktop sharing server, or a collaboration server. In yet another embodiment, any of the applications may comprise any type of hosted service or products, such as GOTOMEETING provided by Citrix Online Division, Inc. of Santa Barbara, Calif., WEBEX provided by WebEx, Inc. of Santa Clara, Calif., or Microsoft Office LIVE MEETING provided by Microsoft Corporation of Redmond, Wash.

In one embodiment, the server 106 includes a policy engine for controlling and managing the access to, selection of application execution methods and the delivery of applications. In another embodiment, the server 106 communicates with a policy engine. In some embodiments, the policy engine determines the one or more applications a user or client 102 may access. In other embodiments, the policy engine determines how the application should be delivered to the user or client 102, e.g., the method of execution. In still other embodiments, the server 106 provides a plurality of delivery techniques from which to select a method of application execution, such as a server-based computing, application streaming, or delivering the application locally to the client 102 for local execution.

In one embodiment, a client 102 requests execution of an application program and a server 106 selects a method of executing the application program. In another embodiment, the server 106 receives credentials from the client 102. In still another embodiment, the server 106 receives a request for an enumeration of available applications from the client 102. In yet another embodiment, in response to the request or receipt of credentials, the server 106 enumerates a plurality of application programs available to the client 102.

In some embodiments, the server 106 selects one of a predetermined number of methods for executing an enumerated application, for example, responsive to a policy of a policy engine. In one of these embodiments, an application delivery system on the server 106 makes the selection. In another of these embodiments, the server 106 may select a method of execution of the application enabling the client 102 to receive output data generated by execution of the application program on a server 106*b*. In still another of these embodiments, the server 106 may select a method of execution of the application enabling the client 102 to execute the application program locally after retrieving a plurality of application files comprising the application. In yet another of these embodiments, the server 106 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to voice over internet protocol (VoIP) communications, such as a soft IP telephone. In further embodiments, the application comprises any application related to real-time data communications, such as applications for streaming video and/or audio.

Figure 1B:
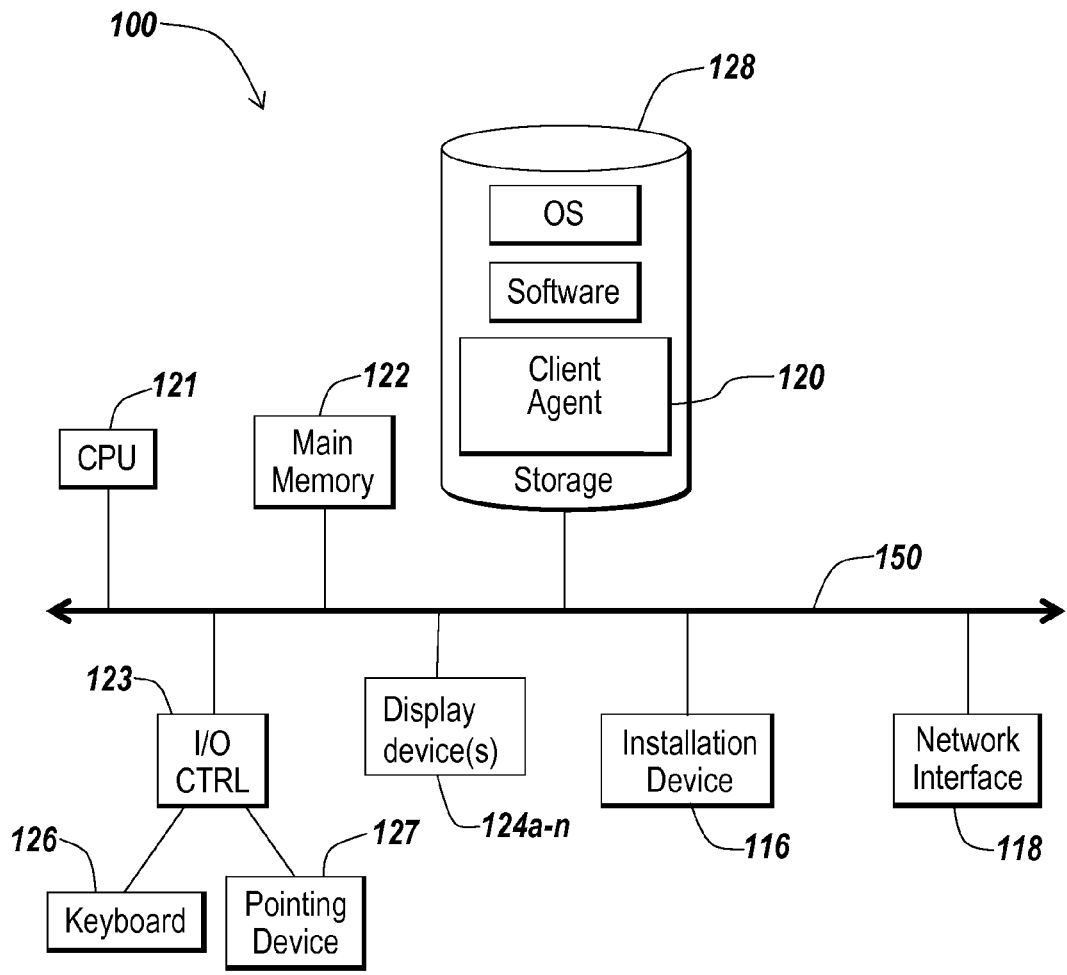
FIGS. 1B and 1C are block diagrams depicting embodiments of computers useful in connection with the methods and systems described herein.
Figure 1C:
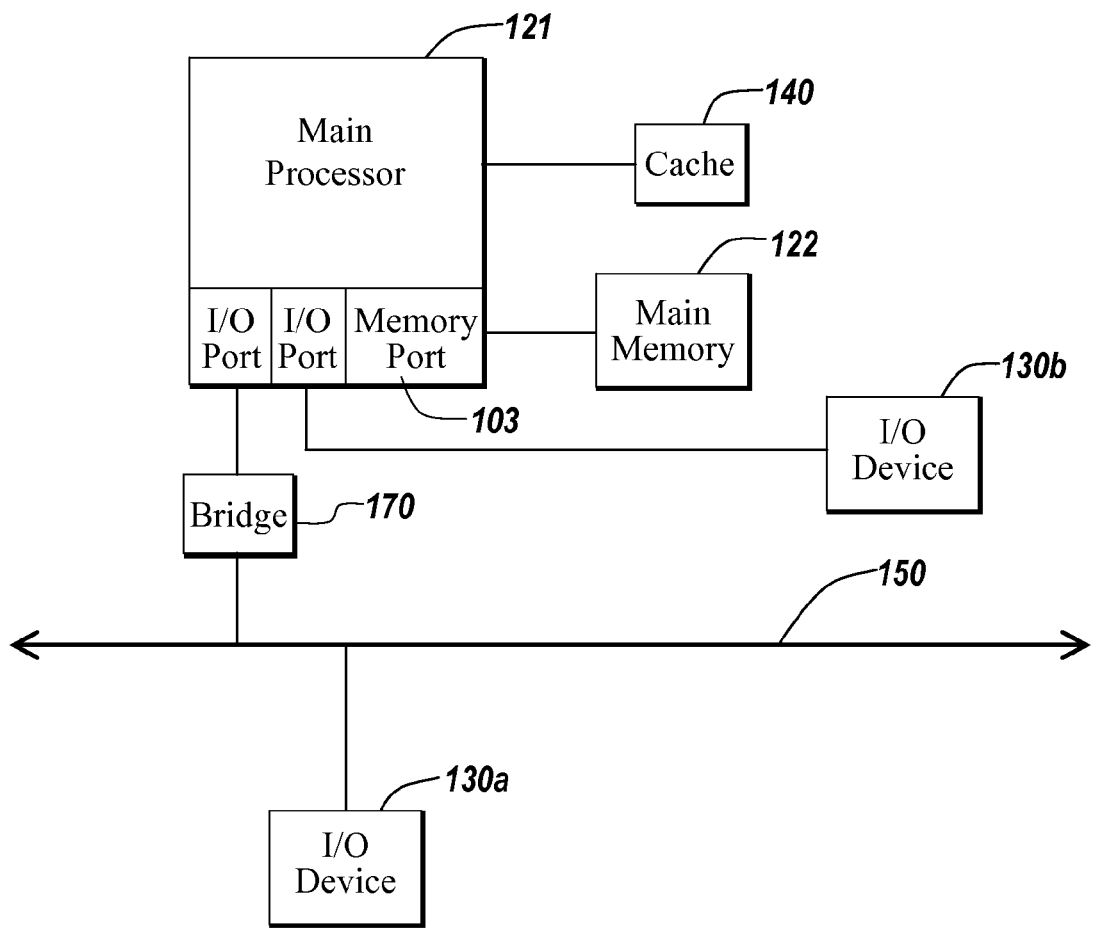

The client 102 and server 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the client 102 or a server 106. As shown in FIGS. 1B and 1C, each computing device 100 includes a central processing unit 121, and a main memory unit 122. As shown in FIG. 1B, a computing device 100 may include a visual display device 124, a keyboard 126 and/or a pointing device 127, such as a mouse. As shown in FIG. 1C, each computing device 100 may also include additional optional elements, such as one or more input/output devices 130*a*-130*b* (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1B the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 communicates directly with I/O device 130*b* via HyperTransport, Rapid I/O, or InfiniBand. FIG. 1C also depicts an embodiment in which local busses and direct communication are mixed: the processor 121 communicates with I/O device 130*a* using a local interconnect bus while communicating with I/O device 130*b* directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In some embodiments, the computing device 100 may have different processors, operating systems, and input devices consistent with the device. For example, in one embodiment the computing device 100 is a Treo 180, 270, 600, 650, 680, 700p or 700w smart phone manufactured by Palm, Inc. In some of these embodiments, the Treo smart phone is operated under the control of the PalmOS operating system and includes a stylus input device as well as a five-way navigator device.

In other embodiments the computing device 100 is a mobile device, such as a JAVA-enabled cellular telephone or personal digital assistant (PDA), such as the i55sr, i58sr, i85s, i88s, i90c, i95c1, or the im11000, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, a server 106 communicates with a policy engine to determine whether a client 102 may access a requested resource. In one of these embodiments, the server 106 collects information about the client 102 and transmits the information to the policy engine for use in making an access control decision. In another of these embodiments, the policy engine collects the information about the client 102. In still another of these embodiments, a collection agent gathers the information about the client 102 and transmits the information to the policy engine, which makes an access control decision.

Figure 2A:
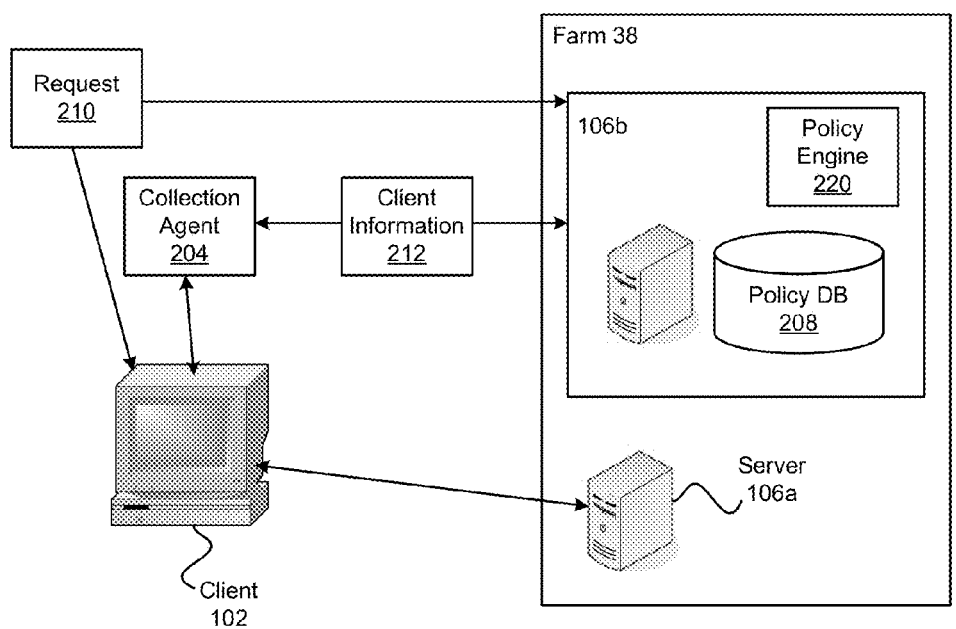
FIG. 2A is a block diagram depicting one embodiment of a network including a policy engine.

Referring now to FIG. 2A, a block diagram depicts one embodiment of a network including a policy engine 220. In one embodiment, the network includes a client 102, a collection agent 204, a policy engine 220, a policy database 208, a farm 38, and an application server 106*a*. In another embodiment, the policy engine 220 is a server 106*b*. Although only one client 102, collection agent 304, policy engine 220, farm 38, and application server 106*a* are depicted in the embodiment shown in FIG. 2A, it should be understood that the system may provide multiple ones of any or each of those components.

In brief overview, when the client 102 transmits a request 210 to the policy engine 220 for access to an application, the collection agent 204 communicates with client 102, retrieving information about the client 102, and transmits the client information 212 to the policy engine 220. The policy engine 220 makes an access control decision by applying a policy from the policy database 208 to the received information 212.

In more detail, the client 102 transmits a request 210 for a resource to the policy engine 220. In one embodiment, the policy engine 220 resides on a server 106*b*. In another embodiment, the policy engine 220 is a server 106*b*. In still another embodiment, a server 106 receives the request 210 from the client 102 and transmits the request 210 to the policy engine 220. In a further embodiment, the client 102 transmits a request 210 for a resource to a server 106*c*, which transmits the request 210 to the policy engine 220.

Upon receiving the request, the policy engine 220 initiates information gathering by the collection agent 204. The collection agent 204 gathers information regarding the client 102 and transmits the information 212 to the policy engine 220.

In some embodiments, the collection agent 204 gathers and transmits the information 212 over a network connection. In some embodiments, the collection agent 204 comprises bytecode, such as an application written in the bytecode programming language JAVA. In some embodiments, the collection agent 204 comprises at least one script. In those embodiments, the collection agent 204 gathers information by running at least one script on the client 102. In some embodiments, the collection agent comprises an Active X control on the client 102. An Active X control is a specialized Component Object Model (COM) object that implements a set of interfaces that enable it to look and act like a control.

In one embodiment, the policy engine 220 transmits the collection agent 204 to the client 102. In another embodiment, a server 106 may store or cache the collection agent 204. The server 106 may then transmit the collection agent 204 to a client 102. In one embodiment, the policy engine 220 requires a second execution of the collection agent 204 after the collection agent 204 has transmitted information 212 to the policy engine 220. In this embodiment, the policy engine 220 may have insufficient information 212 to determine whether the client 102 satisfies a particular condition. In other embodiments, the policy engine 220 requires a plurality of executions of the collection agent 204 in response to received information 212.

In some embodiments, the policy engine 220 transmits instructions to the collection agent 204 determining the type of information the collection agent 204 gathers. In those embodiments, a system administrator may configure the instructions transmitted to the collection agent 204 from the policy engine 220. This provides greater control over the type of information collected. This also expands the types of access control decisions that the policy engine 220 can make, due to the greater control over the type of information collected. The collection agent 204 gathers information 212 including, without limitation, machine ID of the client 102, operating system type, existence of a patch to an operating system, MAC addresses of installed network cards, a digital watermark on the client device, membership in an Active Directory, existence of a virus scanner, existence of a personal firewall, an HTTP header, browser type, device type, network connection information such as internet protocol address or range of addresses, machine ID of the server 106, date or time of access request including adjustments for varying time zones, and authorization credentials. In some embodiments, a collection agent gathers information to determine whether an application can be accelerated on the client using an acceleration program.

In some embodiments, the device type is a personal digital assistant. In other embodiments, the device type is a cellular telephone. In other embodiments, the device type is a laptop computer. In other embodiments, the device type is a desktop computer. In other embodiments, the device type is an Internet kiosk.

In some embodiments, the digital watermark includes data embedding. In some embodiments, the watermark comprises a pattern of data inserted into a file to provide source information about the file. In other embodiments, the watermark comprises data hashing files to provide tamper detection. In other embodiments, the watermark provides copyright information about the file.

In some embodiments, the network connection information pertains to bandwidth capabilities. In other embodiments, the network connection information pertains to Internet Protocol address. In still other embodiments, the network connection information consists of an Internet Protocol address. In one embodiment, the network connection information comprises a network zone identifying the logon agent to which the client 102 provided authentication credentials.

In some embodiments, the authorization credentials include a number of types of authentication information, including without limitation, user names, client names, client addresses, passwords, PINs, voice samples, one-time passcodes, biometric data, digital certificates, tickets, etc. and combinations thereof. After receiving the gathered information 212, the policy engine 220 makes an access control decision based on the received information 212.

Figure 2B:
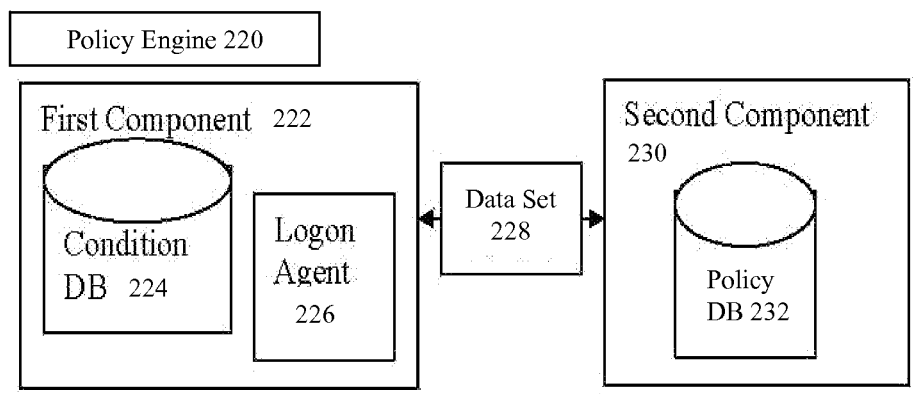
FIG. 2B is a block diagram depicting one embodiment of a policy engine, including a first component comprising a condition database and a logon agent, and including a second component comprising a policy database.

Referring now to FIG. 2B, a block diagram depicts one embodiment of a policy engine 220, including a first component 222 comprising a condition database 224 and a logon agent 226, and including a second component 230 comprising a policy database 232. The first component 222 applies a condition from the condition database 224 to information received about client 102 and determines whether the received information satisfies the condition.

In some embodiments, a condition may require that the client 102 execute a particular operating system to satisfy the condition. In some embodiments, a condition may require that the client 102 execute a particular operating system patch to satisfy the condition. In still other embodiments, a condition may require that the client 102 provide a MAC address for each installed network card to satisfy the condition. In some embodiments, a condition may require that the client 102 indicate membership in a particular Active Directory to satisfy the condition. In another embodiment, a condition may require that the client 102 execute a virus scanner to satisfy the condition. In other embodiments, a condition may require that the client 102 execute a personal firewall to satisfy the condition. In some embodiments, a condition may require that the client 102 comprise a particular device type to satisfy the condition. In other embodiments, a condition may require that the client 102 establish a particular type of network connection to satisfy the condition.

If the received information satisfies a condition, the first component 222 stores an identifier for that condition in a data set 228. In one embodiment, the received information satisfies a condition if the information makes the condition true. For example, a condition may require that a particular operating system be installed. If the client 102 has that operating system, the condition is true and satisfied. In another embodiment, the received information satisfies a condition if the information makes the condition false. For example, a condition may address whether spyware exists on the client 102. If the client 102 does not contain spyware, the condition is false and satisfied.

In some embodiments, the logon agent 226 resides outside of the policy engine 220. In other embodiments, the logon agent 226 resides on the policy engine 220. In one embodiment, the first component 222 includes a logon agent 226, which initiates the information gathering about client 102. In some embodiments, the logon agent 226 further comprises a data store. In these embodiments, the data store includes the conditions for which the collection agent may gather information. This data store is distinct from the condition database 224.

In some embodiments, the logon agent 226 initiates information gathering by executing the collection agent 204. In other embodiments, the logon agent 226 initiates information gathering by transmitting the collection agent 204 to the client 102 for execution on the client 102. In still other embodiments, the logon agent 226 initiates additional information gathering after receiving information 212. In one embodiment, the logon agent 226 also receives the information 212. In this embodiment, the logon agent 226 generates the data set 228 based upon the received information 212. In some embodiments, the logon agent 226 generates the data set 228 by applying a condition from the database 224 to the information received from the collection agent 204.

In another embodiment, the first component 222 includes a plurality of logon agents 226. In this embodiment, at least one of the plurality of logon agents 226 resides on each network domain from which a client 102 may transmit a resource request. In this embodiment, the client 102 transmits the resource request to a particular logon agent 226. In some embodiments, the logon agent 226 transmits to the policy engine 220 the network domain from which the client 102 accessed the logon agent 226. In one embodiment, the network domain from which the client 102 accesses a logon agent 226 is referred to as the network zone of the client 102.

The condition database 224 stores the conditions that the first component 222 applies to received information. The policy database 232 stores the policies that the second component 230 applies to the received data set 228. In some embodiments, the condition database 224 and the policy database 232 store data in an ODBC-compliant database. For example, the condition database 224 and the policy database 232 may be provided as an ORACLE database, manufactured by Oracle Corporation of Redwood Shores, Calif. In other embodiments, the condition database 224 and the policy database 232 can be a MICROSOFT ACCESS database or a MICROSOFT SQL server database, manufactured by Microsoft Corporation of Redmond, Wash.

After the first component 222 applies the received information to each condition in the condition database 224, the first component transmits the data set 228 to second component 230. In one embodiment, the first component 222 transmits only the data set 228 to the second component 230. Therefore, in this embodiment, the second component 230 does not receive information 212, only identifiers for satisfied conditions. The second component 230 receives the data set 228 and makes an access control decision by applying a policy from the policy database 232 based upon the conditions identified within data set 228.

In one embodiment, policy database 232 stores the policies applied to the received information 212. In one embodiment, the policies stored in the policy database 232 are specified at least in part by the system administrator. In another embodiment, a user specifies at least some of the policies stored in the policy database 232. The user-specified policy or policies are stored as preferences. The policy database 232 can be stored in volatile or non-volatile memory or, for example, distributed through multiple servers.

In one embodiment, a policy allows access to a resource only if one or more conditions are satisfied. In another embodiment, a policy allows access to a resource but prohibits transmission of the resource to the client 102. Another policy might make connection contingent on the client 102 that requests access being within a secure network. In some embodiments, the resource is an application program and the client 102 has requested execution of the application program. In one of these embodiments, a policy may allow execution of the application program on the client 102. In another of these embodiments, a policy may enable the client 102 to receive a stream of files comprising the application program. In this embodiment, the stream of files may be stored and executed in an isolation environment. In still another of these embodiments, a policy may allow only execution of the application program on a server 106, such as an application server, and require the server 106 to transmit output data to the client 102.

Figure 2C:
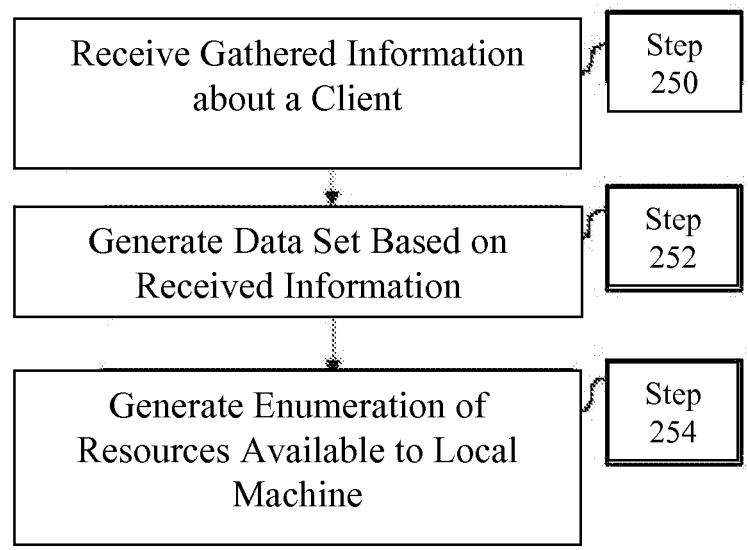
FIG. 2C is a flow diagram depicting one embodiment of the steps taken by the policy engine to make an access control decision based upon information received about a client.

Referring now to FIG. 2C, a flow diagram depicts one embodiment of the steps taken by the policy engine 220 to make an access control decision based upon information received about a client 102. Upon receiving gathered information about the client 102 (step 250), the policy engine 220 generates a data set based upon the information (step 252). The data set 228 contains identifiers for each condition satisfied by the received information 212. The policy engine 220 applies a policy to each identified condition within the data set 228. That application yields an enumeration of resources which the client 102 may access (step 254). The policy engine 220 then presents that enumeration to the client 102. In some embodiments, the policy engine 220 creates a Hypertext Markup Language (HTML) document used to present the enumeration to the client.

In some embodiments, a determination is made as to a type of connection to establish when granting access to a resource responsive to a determination by a policy engine such as the policy engine 220 described above in FIG. 2A, FIG. 2B and FIG. 2C. In other embodiments, a determination is made as to a method for granting access to a resource, such as a method for execution, responsive to a determination by a policy engine such as the policy engine 220 described above in connection with FIG. 2A, FIG. 2B and FIG. 2C. In still other embodiments, the server 106 receiving the credentials and the request to execute the resource further comprises such a policy engine 220.

In some embodiments, one of a plurality of access rights is identified, responsive to a policy. In one of these embodiments, the identification is made responsive to an application of a policy to information associated with the client 102. In another of these embodiments, the selection is made by a policy engine such as the policy engine 220 described above in FIG. 2A, FIG. 2B and FIG. 2C. In still another of these embodiments, the types of access rights include, without limitation, rights to read, write, modify, download, save local copies, execute, print, and email a requested resource.

Figure 3A:
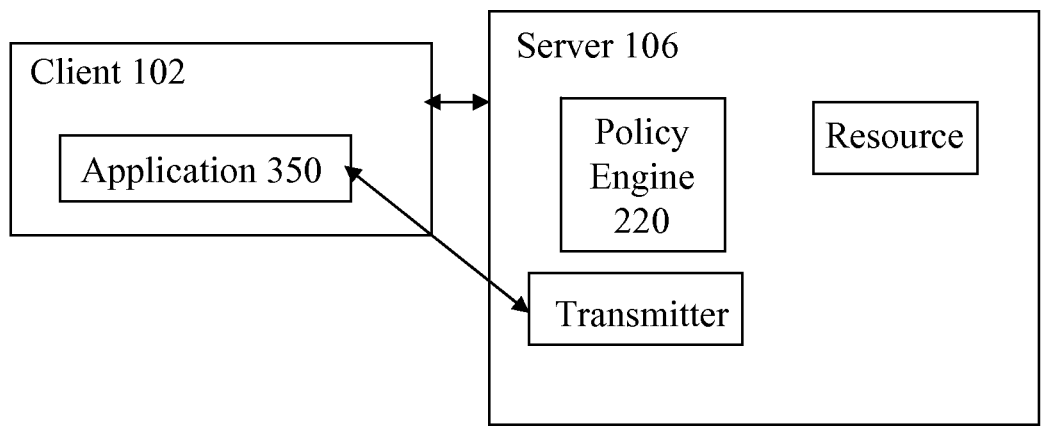
FIG. 3A is a block diagram depicting one embodiment of a system for dynamically associating access rights with a resource.

Referring now to FIG. 3A, a block diagram depicts one embodiment of a system for dynamically associating access rights with a resource. In brief overview, the system includes a server 106, a policy engine 220, and an application program 350. The server receives a request for access to a resource from a client 102. The policy engine 220 receives a request from the server 106 for an identification of a plurality of access rights to associate with the resources, the plurality of access rights identified responsive to an application of a policy to the client 102. The application program 350 receives, from the server, a copy of the resource associated with the identified plurality of access rights via a rights markup language, and an identification of the associated plurality of access rights.

The server 106 receives a request for access to a resource from a client 102. In some embodiments, the server 106 is a web proxy server. In one embodiment, the client 102 requests access to a file, such as a document. In another embodiment, the client 102 requests access to a resource for processing by an application program 350 that is XRML-aware (extensible-rights-markup-language-aware).

In one embodiment, the server 106 comprises a collection agent gathering information from the client 102. In another embodiment, the server 106 comprises a means for transmitting the collection agent to the client 102. In another embodiment, the server 106 comprises a policy engine 220. In still another embodiment, the server 106 is in communication with the policy engine 220. In some embodiments, the requested resource resides on the server 106. In other embodiments, the requested resource resides on a server 106b.

In some embodiments, the server 106 comprises a means for associating access rights with the requested resource. In one of these embodiments, the server 106 retrieves a copy of the requested resource. In another of these embodiments, the server 106 associates an access right with a copy of the requested resource by signing the copy. In still another of these embodiments, the server 106 comprises a means for signing the resource using an extensible rights markup language (XRML). In other embodiments, the server 106 configures the rights management attributes of a document requested by a client 102. In one of these embodiments, the server configures the rights management attributes based on policies defined by an administrator.

In one embodiment, the server associates an access right with a resource using a rights management language, a rights expression language, or other language for managing digital rights. In another embodiment, the server generates an XRML (extensible rights markup language) assertion grant according to the XRML (extensible rights markup language) 2.0 standard developed by ContentGuard, Inc., of El Segundo, Calif., and maintained by the Motion Picture Experts Group (MPEG). In still another embodiment, the server generates an expression of terms and conditions applicable to the resource, according to the Open Digital Rights Language (ODRL) standard submitted by IPR Systems Pty Ltd to the World Wide Web Consortium and maintained by the World Wide Web Consortium.

In some embodiments, the server generates an identification of the client, an identification of a resource, an identification of one more rights granted to the client when the client requests access to the resource. In other embodiments, the server associates the resource an access right with a resource by using technology to persist rights management information, the access right enforceable by an application program processing the resource for a user of the client.

In one embodiment, the server 106 comprises a means for associating the resource with a right to retrieve the resource.

In another embodiment, the server 106 comprises a means for associating the resource with a requirement to view a version of the file displayed using the Hypertext Markup Language (HTML). In still another embodiment, the server 106 comprises a means for associating the resource with a right to receive output data generated by an execution of the resource on an application server. In even still another embodiment, the server 106 comprises a means for associating the resource with a right to print a copy of the resource. In yet another embodiment, the server 106 comprises a means for associating the resource with a right to save a local copy of the resource. In a further embodiment, the server 106 comprises a means for associating the resource with a right to transmit, via electronic mail, a copy of the resource.

In one embodiment, the server 106 comprises a transmitter. In another embodiment, the transmitter sends the request for access to the resource to the policy engine 220. In still another embodiment, the transmitter sends, to the client 102, a copy of the resource associated with a plurality of access rights identified by the policy engine 220. In yet another embodiment, the transmitter sends, to a server 106b, a copy of the resource digitally signed by the server, an identification of the plurality of access rights identified by the policy engine 220 included in the digital signature.

The policy engine 220 receives a request from the server 106 for an identification of a plurality of access rights to associate with the resources, the plurality of access rights identified responsive to an application of a policy to the client 102. In some embodiments, the policy engine 220 provides the functionality described above in connection with FIG. 2A, FIG. 2B, and FIG. 2C. In one embodiment, the policy engine 220 comprises a collection agent gathering information about the client 102. In another embodiment, the policy engine 220 transmits the collection agent to the client 102. In still another embodiment, the policy engine 220 transmits the collection agent to the server 106 for transmission to the client 102.

In one embodiment, the policy engine 220 comprises a policy database. In another embodiment, the policy engine 220 applies a policy from the policy database to information gathered about the client 102. In still another embodiment, the policy engine 220 receives gathered information from the server 106. In yet another embodiment, the policy engine 220 receives gathered information from a collection agent. In some embodiments, the policy engine 220 provides the functionality of the policy engine described below in connection with FIGS. 2A, 2B, and 2C.

In some embodiments, the policy engine identifies one or more access rights for association with the requested resource, responsive to an application of a policy to the client requesting the access. In one of these embodiments, the policy engine determines that the client may view a requested resource. In another of these embodiments, the policy engine determines that the client may modify a requested resource. In still another of these embodiments, the policy engine determines that the client may retrieve a copy of the requested resource. In yet another of these embodiments, the policy engine determines that the client may store a copy of a requested resource. In another of these embodiments, the policy engine determines that a viewer of the resource may copy content from the resource. In still another of these embodiments, the policy engine determines that a viewer of the resource may paste content into the resource.

In another of these embodiments, the policy engine determines that the client may not access the resource as requested. In still another of these embodiments, the policy engine identifies an alternate method for accessing the resource. For example, the policy engine may allow the client to view a read-only copy of a resource and deny the client the ability to modify the resource. In another example, the policy engine may allow the client to receive output data generated by an execution of the resource on a remote server and deny the client the ability to execute the resource locally. In still another example, the policy engine may allow or deny a client request to copy content from the resource, paste content into the resource, print, email or save a local copy of the resource.

The server 106 receives the identification of the plurality of access rights from the policy engine 220. The server 106 associates the identification of the plurality of access rights with the requested resource. The application program 350 receives, from the server 106, a copy of the resource associated with the identified plurality of access rights via a rights markup language (such as XRML), and an identification of the associated plurality of access rights.

In one embodiment, the application program 350 comprises a means for making an access control decision responsive to the identification of the associated plurality of access rights. In another embodiment, the application program 350 comprises a component for applying an access right in the associated plurality of access rights to the request for the resource. In still another embodiment, the application program 350 comprises a means for denying a request to retrieve the resource. In yet another embodiment, the application program 350 comprises a means for allowing a request to retrieve the resource.

In one embodiment, the application program 350 parses an XRML (extensible rights markup language) assertion grant generated according to the XRML (extensible rights markup language) 2.0 standard developed by ContentGuard, Inc., of El Segundo, Calif., and maintained by the Motion Picture Experts Group (MPEG). In another embodiment, the application program 350 parses an expression of terms and conditions applicable to the resource, generated according to the Open Digital Rights Language (ODRL) standard submitted by IPR Systems Pty Ltd to the World Wide Web Consortium and maintained by the World Wide Web Consortium.

In one embodiment, the application program 350 includes a component for parsing an identification of a plurality of access rights associated with a resource. In another embodiment, the application program 350 is configured to identify an access right associated with a resource. In still another embodiment, the application program 350 is configured to identify an access right enumerated within a digital signature. In yet another embodiment, the application program 350 accesses a file, such as an XML manifest file identifying the plurality of access rights, associated with the resource to make the access control decision.

In some embodiments, the application program 350 comprises a word processing or spreadsheet application program. In other embodiments, the application program 350 comprises a client agent on the client 102. In one of these embodiments, the client agent comprises an agent using a presentation layer protocol to communicate with the server 106, such as an ICA client, an RDP client, or an X11 client. In still other embodiments, the application program 350 comprises a rights management agent enforcing digital rights policies on the client 102. In one of these embodiments, the application program 350 comprises an application program enforcing a network access policy. In another of these embodiments, the application program 350 comprises a collection agent as described above in connection with FIGS. 2A, 2B, and 2C, and transmits information associated with the client to the policy engine, directly or via the server 106.

In one embodiment, the application program 350 supports technology persisting rights management information and is able to enforce the associated access rights. The application program 350 may be, for example, a word processing document, a spreadsheet processing application, or any other common application program. In another embodiment, the application program 350 may be any type of program supporting technology persisting rights management information and able to enforce the associated access rights.

In some embodiments, the application program 350 provides restricted access to the resource according to the rights markup language (such as XRML). In one embodiment, the application program 350 grants a request for access to the resource, responsive to the identified plurality of access rights. In another of these embodiments, the application program 350 denies the requested access and provides an alternate method for accessing the resource. In still another of these embodiments, the application program 350 denies the request for access to the resource, responsive to the identified plurality of access rights.

In one embodiment, the application program 350 comprises a means for viewing a version of the resource displayed using the Hypertext Markup Language (HTML). In another embodiment, the application program 350 comprises a connection to a client agent on the client 102 receiving output data generated by an execution of the resource on an application server 106, 106*b*. In still another embodiment, the application program 350 denies a request to retrieve and execute a resource on the client 102. In yet another embodiment, the application program 350 provides an alternate means for accessing the resource by providing the output data generated by the execution of the resource on the application server 106. In a further embodiment, the application program 350 restricts the use of the output data. For example, the application program 350 may allow or deny a request to print, email, or store locally the received output data.

Figure 3B:
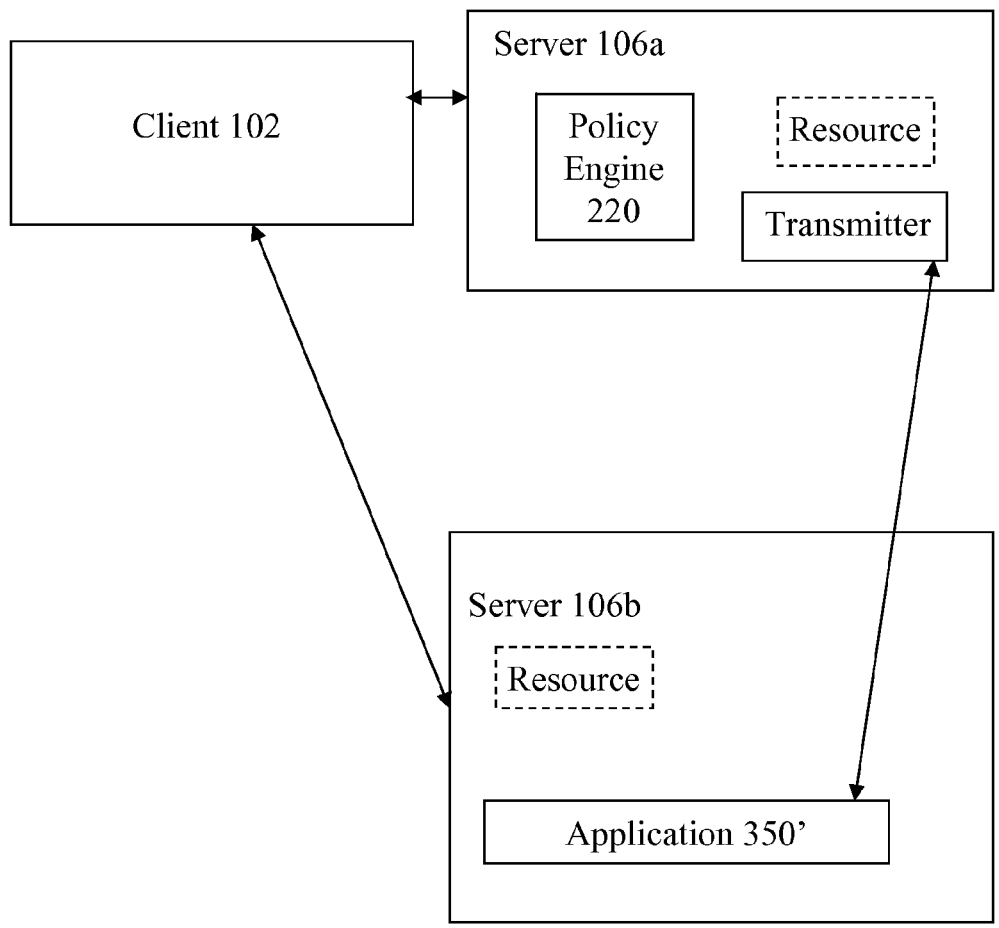
FIG. 3B is a block diagram depicting one embodiment of a system for dynamically associating access rights in which a server 106 sends a resource and an identification of an associated plurality of access rights to an application program executing on a second server.

Referring now to FIG. 3B, in one embodiment a transmitter on the server 106*a* sends the resource and the identification of the associated plurality of access rights to an application program 350' executing on a second server 106*b*. In another embodiment, the application program 350' executing on the second server 106*b* comprises a means for making an access control decision responsive to an access right in the associated plurality of access rights. In still another embodiment, the application program 350' executing on the second server 106*b* comprises a means for providing restricted access to the resource responsive to the access control decision. In yet another embodiment, the application program 350' executing on the second server 106*b* further comprises an agent for transmitting output data generated by the application program 350' to the client and providing restricted access to the output data responsive to the access control decision.

In one embodiment, the application program 350' denies a request to retrieve and execute a resource on the client 102. In another embodiment, the application program 350' provides an alternate means for accessing the resource by providing the output data generated by the execution of the resource on the application server 106. In still another embodiment, the application program 350' restricts the use of the output data. For example, the application program 350' may allow or deny a request to print, email, or store locally the received output data.

In some embodiments, the server 106 provides the functionality described above in connection with FIG. 3A. In other embodiments, the application program 350' provides the functionality described above in connection with the application program 350 of FIG. 3A.

In some embodiments, the client requests access to a resource not previously associated with an access right. In one of these embodiments, the server determines that the resource is not yet associated with an access right. In another of these embodiments, the server requests an identification of a plurality of access rights from a policy engine. In still another of these embodiments, the policy engine applies a policy to the client, or to information associated with the client, to determine what access, if any, the server should grant to the client. In still another of these embodiments, the policy engine transmits an identification of the plurality of access rights to the server. In yet another of these embodiments, the server associates the plurality of access rights with the resource.

Figure 4:
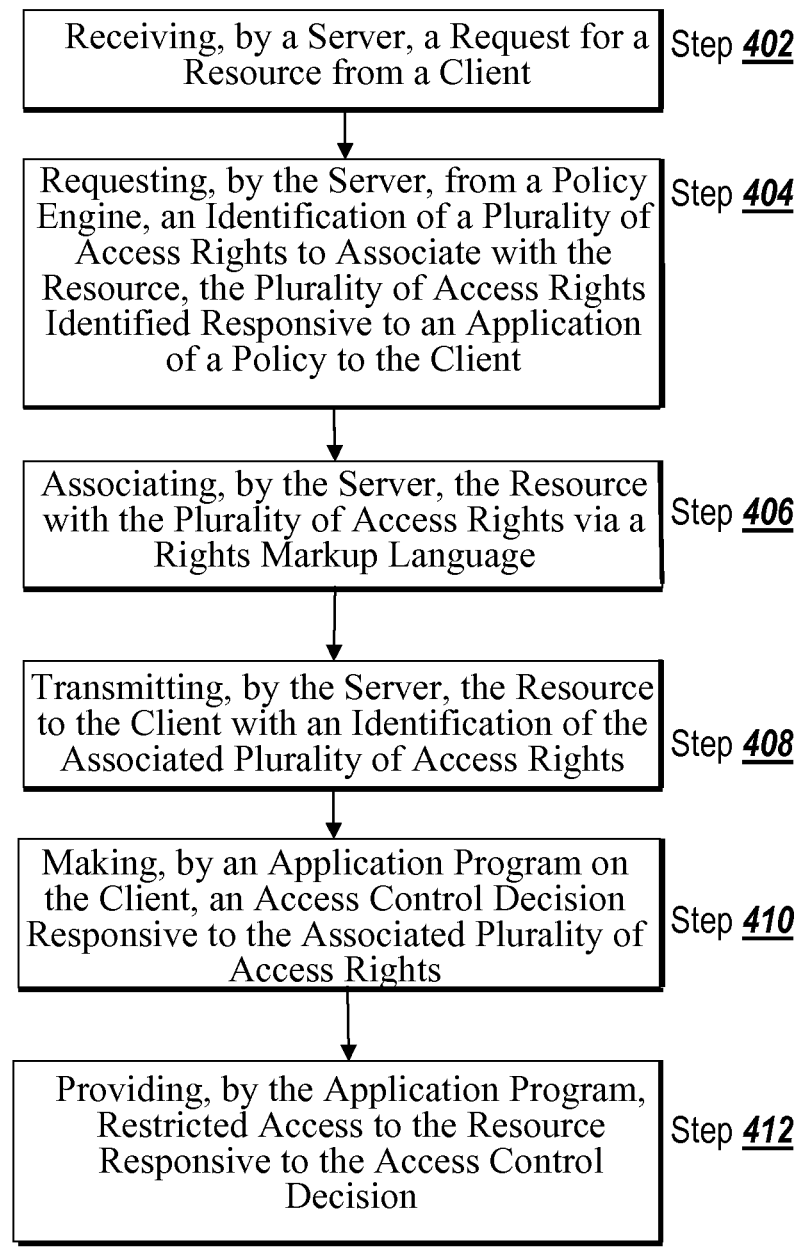
FIG. 4 is a flow diagram depicting one embodiment of the steps taken in a method for dynamically associating, by a server, access rights with a resource.

Referring now to FIG. 4, a flow diagram depicts one embodiment of the steps taken in a method for dynamically associating, by a server, access rights with a resource. In brief overview, a server receives a request for a resource from a client (step 402). The server requests from a policy engine, an identification of a plurality of access rights to associate with the resource, the plurality of access rights identified responsive to an application of a policy to the client (step 404). The server associates the resource with the plurality of access rights via a rights markup language (step 406). The server transmits the resource to the client with an identification of the associated plurality of access rights (step 408). An application program on the client makes an access control decision responsive to the associated plurality of access rights (step 410). The application program provides restricted access to the resource, responsive to the access control decision (step 412).

A server receives a request for a resource from a client (step 402). In one embodiment, a server 106 receives the request for the resource from the client 102. In another embodiment, the client 102 requests access to a file, such as a document.

The server requests from a policy engine, an identification of a plurality of access rights to associate with the resource, the plurality of access rights identified responsive to an application of a policy to the client (step 404). In one embodiment, information is gathered about the client. In another embodiment, the policy engine gathers the information about the client to make access control decision. In still another embodiment, the server gathers the information about the client. In yet another embodiment, the server transmits the gathered information about the client to the policy engine. In some embodiments, the application program gathers the information about the client and transmits the gathered information to the policy engine, directly or via the server.

In one embodiment, the server receives an identification of a plurality of access rights to associate with the requested resource. In another embodiment, the server receives an identification of a plurality of access rights including a right to retrieve a file. In still another embodiment, the server receives an identification of a plurality of access rights including a right to view a version of a file displayed using the Hypertext Markup Language (HTML). In yet another embodiment, the server receives an identification of a plurality of access rights including a right to receive output data generated by an execution of the resource on an application server.

In one embodiment, the server receives an identification of a plurality of access rights including a right to print a copy of the resource. In another embodiment, the server receives an identification of a plurality of access rights including a right to save a local copy of the resource. In still another embodiment, the server receives an identification of a plurality of access rights including a right to transmit, via electronic mail, a copy of the resource.

The server associates the resource with the plurality of access rights via a rights markup language (step 406). In one embodiment, the server uses an extensible rights markup language (XRML) to associate the resource with the plurality of access rights. In another embodiment, the server retrieves a copy of the resource and signs the copy using XRML (extensible rights markup language). In still another embodiment, the server generates an XRML (extensible rights markup language) assertion grant according to the XRML (extensible rights markup language) 2.0 standard developed by ContentGuard, Inc., of El Segundo, Calif., and maintained by the Motion Picture Experts Group (MPEG). In yet another embodiment, the server generates an expression of terms and conditions applicable to the resource, according to the Open Digital Rights Language (ODRL) standard submitted by IPR Systems Pty Ltd to the World Wide Web Consortium and maintained by the World Wide Web Consortium.

In some embodiments, the server 106 generates a copy of the requested resource. In one of these embodiments, the server 106 creates an encrypted copy of a requested document. In another of these embodiments, the server 106 acquires a license authorizing the client for access to the encrypted copy. In still another of these embodiments, the server 106 acquires a license identifying a plurality of access rights. In yet another of these embodiments, the server 106 generates a file, such as an XML manifest file, identifying the plurality of access rights. In other embodiments, the server 106 associates a copy of the resource with the generated file. In still other embodiments, the server 106 generates a digital certificate identifying the plurality of access rights and transmits the digital certificate with the copy of the requested resource. In yet other embodiments, the server 106 creates a copy of the file which contains rights management information within it. In one of these embodiments, once the application validates the file with the server, it is able to enforce those rights at runtime.

The server transmits the resource to the client with an identification of the associated plurality of access rights (step 408). In one embodiment, the server 106 transmits the resource to an application program on the client 102. In another embodiment, the server transmits a signed copy of the resource to the client, the signature identifying the associated plurality of access rights. In other embodiments, the server 106 transmits the resource to an application program executing on a second server 106*b* with the identification of the associated plurality of access rights, as described above in connection with FIG. 3B.

An application program on the client makes an access control decision responsive to the associated plurality of access rights (step 410). In one embodiment, the application program identifies an access right enumerated within a digital signature. In another embodiment, the application program accesses a file associated with the resource, such as an XML manifest file identifying the plurality of access rights, to make the access control decision. In still another embodiment, the application program decrypts the received resource. In yet another embodiment, the application program identifies the associated plurality of access rights upon decryption of the received resource.

In one embodiment, the server creates a copy of the file which contains the rights management information within it. In another embodiment, the application program identifies the associated plurality of access rights. In still another embodiment, the application validates the file with the server. In yet another embodiment, the application program determines which features to enable or disable for a user of the application program, responsive to the identified plurality of access rights. In a further embodiment, the application program enforces those rights at runtime.

The application program provides restricted access to the resource, responsive to the access control decision (step 412). In some embodiments, the application program allows the requested access to the resource. In other embodiments, the application program allows an alternate, restricted method of accessing the resource. In still other embodiments, the application program denies the request for access to the resource.

In one embodiment, the application program denies a request to retrieve the resource. In another embodiment, the application program displays a version of the resource using the Hypertext Markup Language (HTML), responsive to a request to retrieve the resource. In still another embodiment, the application program allows a request to retrieve the resource.

In one embodiment, the application program denies a request to modify the resource. Modification of the resource may include pasting content into the resource. In another embodiment, the application program denies a request to copy content from the resource. In still another embodiment, the application program denies a request to receive output data generated by an execution of the resource on an application server. In still another embodiment, the application program allows a request to receive output data generated by an execution of the resource on an application server. In yet another embodiment, the application program allows the client to receive output data generated by an execution of the resource on an application server, responsive to a request to retrieve the resource.

In some embodiments, the server transmits the resource and the associated plurality of access rights to an application program executing on a second server. In one of these embodiments, the server 106 transmits the resource to a server 106b. In another of these embodiments, the application program executing on the second server makes an access control decision responsive to the identified at least one access right. In still another of these embodiments, the application program executing on the second server provides restricted access to the resource responsive to the access control decision. In yet another of these embodiments, the second server 106b transmits output data generated by executing the application program, access to the output data restricted responsive to the access control decision.

In some embodiments, the server 106 may associate a different plurality of access rights to the resource upon receiving a request from a second client 102b. In other embodiments, the server 106 may associate a different plurality of access rights to the resource upon receiving a second request from the client 102 for access. In some embodiments, the functionality described above enables a server 106 to dynamically associate access rights with a requested resource responsive to an application of a policy to a client 102 requesting access to the resource. In other embodiments, the server 106 may dynamically associate levels of access with a requested resource responsive to an application of a policy to a client 102 requesting access to the resource.

The systems and methods described above may be provided as one or more computer-readable programs embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, LISP, PERL, C, C++, PROLOG, or any byte code language such as JAVA. The software programs may be stored on or in one or more articles of manufacture as object code.

Having described certain embodiments of methods and systems for dynamically associating access rights with resources, it will now become apparent to one of skill in the art that other embodiments incorporating the concepts of the invention may be used. Therefore, the invention should not be limited to certain embodiments, but rather should be limited only by the spirit and scope of the following claims.

What is claimed is:

1. A method for dynamically associating, by a server, access rights with a resource, the method comprising the steps of:
   (a) receiving, by a server, a request for a resource from a client;
   (b) transmitting, by a policy engine executing on the server, a collection agent to the client in response to receiving the request;
   (c) receiving, by the policy engine from the collection agent executing on the client, client information;
   (d) applying, by a first component of the policy engine, policies to the client information to generate a dataset comprising a plurality of identifiers, each of the plurality of identifiers identifying a respective condition satisfied by the client information;
   (e) transmitting, by the first component of the policy engine to a second component of the policy engine, the dataset comprising the plurality of identifiers;
   (f) applying, by the second component of the policy engine, policies to the dataset to identify a plurality of levels of access rights associated with the resource;
   (g) requesting, by the server from the second component of the policy engine, the plurality of levels of access rights to associate with the resource;
   (h) signing, by the server, the resource with the plurality of levels of access rights via an extensible rights markup language;
   (i) transmitting, by the server, the resource signed with the plurality of levels of access rights to the client;
   (j) making, by an application program responsive to receiving from the server the signed resource, an access control decision using the plurality of levels of access rights, the application program executing on the client; and
   (k) providing, by the application program, restricted access to the resource responsive to the access control decision.

2. The method of claim 1, wherein step (g) further comprises receiving, by the server, an identification of a plurality of levels of access rights including a right to retrieve a file.

3. The method of claim 1, wherein step (g) further comprises receiving, by the server, an identification of a plurality of levels of access rights including a right to view a version of a file displayed using a version of the Hypertext Markup Language (HTML) standard.

4. The method of claim 1, wherein step (g) further comprises receiving, by the server, an identification of a plurality of levels of access rights including a right to receive output data generated by an execution of the resource on an application server.

5. The method of claim 1, wherein step (g) further comprises receiving, by the server, an identification of a plurality of levels of access rights including a right to print a copy of the resource.

6. The method of claim 1, wherein step (g) further comprises receiving, by the server, an identification of a plurality of levels of access rights including a right to save a local copy of the resource.

7. The method of claim 1, wherein step (g) further comprises receiving, by the server, an identification of a plurality of levels of access rights including a right to transmit via electronic mail a copy of the resource.

8. The method of claim 1, wherein step (k) further comprises denying, by the application program, a request to retrieve the resource.

9. The method of claim 1, wherein step (k) further comprises denying, by the application program, a request to modify the resource.

10. The method of claim 1, wherein step (k) further comprises the step of denying, by the application program, a request to receive output data generated by an execution of the resource on an application server.

11. The method of claim 1, wherein step (k) further comprises allowing, by the application program, a request to retrieve the resource.

12. The method of claim 1, wherein step (k) further comprises displaying, by the application program, a version of the resource displayed using a version of the Hypertext Markup Language (HTML) standard, responsive to a request to retrieve the resource.

13. The method of claim 1, wherein step (k) further comprises allowing, by the application program, a request to receive output data generated by an execution of the resource on an application server.

14. The method of claim 1, wherein step (k), comprises providing, by the application program executing on a second server, restricted access to the resource responsive to the access control decision.

15. The method of claim 1, wherein step (k) further comprises transmitting, by a second server, output data generated by executing the application program, access to the output data restricted responsive to the access control decision.

16. The method of claim 1 wherein step (h) comprises signing, by the server, the resources with the plurality of levels of access rights using an extensible right markup language assertion grant.

17. The method of claim 1 wherein step (h) comprises signing, by the server, the resource with the plurality of levels of access rights using an expression of terms and conditions applicable to the resource using the Open Digital Rights Language standard.

18. A system for dynamically associating access rights with a resource comprising:
a server receiving a request for access to a resource from a client;
a policy engine executing on the server to:
transmit a collection agent to the client in response to receiving the request,
receive from the collection agent executing on the client, client information,
a first component of the policy engine executing on the server to:
apply policies to the client information to generate a dataset comprising a plurality of identifiers, each of the plurality of identifiers indentifying a respective condition satisfied by the client information,
transmit the dataset comprising the plurality of identifiers to a second component of the policy engine,
the second component of the policy engine executing on the server to:
apply policies to the dataset to identify a plurality of levels of access rights associated with the resource,
receive a request from the server for an identification of a plurality of levels of access rights to associate with the resource;
wherein the server signs the resource with the plurality of levels of access rights via an extensible rights markup language, and transmits the resource signed with the associated plurality of levels of access rights to the client; and
an application program executing on the client to:
receive, from the server, a copy of the resource signed with the plurality of levels of access rights,
make an access control decision in response to receiving from the server the resource signed with the plurality of levels of access rights using the plurality of levels of access rights, and
provide restricted access to the resource responsive to the access control decision.

19. The system of claim 18, wherein the server further comprises a means for associating the resource with a right to retrieve the resource.

20. The system of claim 18, wherein the server further comprises a means for associating the resource with a requirement to view a version of a file displayed using a version of the Hypertext Markup Language (HTML) standard.

21. The system of claim 18, wherein the server further comprises a means for associating the resource with a right to receive output data generated by an execution of the resource on an application server.

22. The system of claim 18, wherein the server further comprises a means for associating the resource with a right to print a copy of the resource.

23. The system of claim 18, wherein the server further comprises a means for associating the resource with a right to save a local copy of the resource.

24. The system of claim 18, wherein the server further comprises a means for associating the resource with a right to transmit via electronic mail a copy of the resource.

25. The system of claim 18, wherein the application program further comprises a component for applying an access right in the associated plurality of levels of access rights to the request for the resource.

26. The system of claim 18, wherein the application program further comprises a means for denying a request to retrieve the resource.

27. The system of claim 18, wherein the application program further comprises a means for allowing a request to retrieve the resource.

28. The system of claim 18, wherein the application program further comprises a means for viewing a version of the resource displayed using a version of the Hypertext Markup Language (HTML) standard.

29. The system of claim 18, wherein the application program further comprises a connection to a client agent displaying on the client received output data generated by an execution of the resource on an application server.

30. The system of claim 18, wherein the server further comprises a transmitter sending the resource and the identification of the associated plurality of levels of access rights to an application program executing on a second server.

31. The system of claim 30, wherein the application program executing on the second server further comprises a means for making an access control decision responsive to an access right in the associated plurality of levels of access rights.

32. The system of claim 30, wherein the application program executing on the second server further comprises a means for providing restricted access to the resource responsive to the access control decision.

33. The system of claim 30, wherein the application program executing on the second server further comprises an agent for transmitting output data generated by the application program to the client and providing restricted access to the output data responsive to the access control decision.

34. The system of claim 18 wherein the server signs the resource with the plurality of levels of access rights using an extensible right markup language assertion grant.

35. The system of claim 18 wherein the server signs the resource with the plurality of levels of access rights using an expression of terms and conditions applicable to the resource using the Open Digital Rights Language standard.

* * * * *